(12) United States Patent
Skiba et al.

(10) Patent No.: US 10,222,017 B2
(45) Date of Patent: Mar. 5, 2019

(54) LAMP SAFE SYSTEM

(71) Applicants: Burt Skiba, Mesa, AZ (US); Clint Solomon, Gilbert, AZ (US); Mark Evans, Morgan Hill, CA (US)

(72) Inventors: Burt Skiba, Mesa, AZ (US); Clint Solomon, Gilbert, AZ (US); Mark Evans, Morgan Hill, CA (US)

( * ) Notice: Subject to any disclaimer, the term of this patent is extended or adjusted under 35 U.S.C. 154(b) by 0 days.

(21) Appl. No.: 15/679,119

(22) Filed: Aug. 16, 2017

(65) Prior Publication Data

US 2018/0156405 A1 Jun. 7, 2018

Related U.S. Application Data

(60) Provisional application No. 62/376,009, filed on Aug. 17, 2016.

(51) Int. Cl.
*F21S 19/00* (2006.01)
*E05B 65/00* (2006.01)
(Continued)

(52) U.S. Cl.
CPC .......... *F21S 19/00* (2013.01); *E05B 47/0002* (2013.01); *E05B 65/0075* (2013.01);
(Continued)

(58) Field of Classification Search
CPC ...... F21V 33/0004; F21V 1/00; F21V 21/096; F21V 21/34; F21V 33/0048; E05G 1/024; E05G 1/04; E05G 1/10; E05G 1/026; F21S 6/002; F21S 19/00; F21S 6/003; E05B 65/0075; E05B 47/0002; E05B 2047/0087; E05B 2047/0013; E05B 2047/0095; E05B 2047/0096; H05B 37/02; A47B 81/005
(Continued)

(56) References Cited

U.S. PATENT DOCUMENTS

| 1,528,618 A * | 3/1925 | Knaster .................. A47B 17/04 312/204 |
| 1,663,377 A * | 3/1928 | Knaster .................. A47B 17/03 109/47 |

(Continued)

*Primary Examiner* — Suzanne L Barrett

(57) ABSTRACT

An embodiment can include a lamp safe system that includes an inner casing member and an outer casing member, a base member, a lampshade, a lamp body, and a base member. A inner casing member can move in and out of an outer casing member, and a lamp body member can be placed over and removably attached to an outer casing member. An inner casing member can include two or more walls, and a top surface and a bottom surface. An inner casing member can have attachment points for a lead, screw, a lead screw nut, and guide rails. An inner casing member can have a locking mechanism that can keep the inner casing member inside an outer casing member and lamp body. An outer casing can substantially surround an inner casing. An outer casing can have attachment points for an inner casing member to move in and out of through guide rail supports An inner casing member can move in and out of an outer casing member through a motor rotating a lead screw. An electronic controlling member can have a microcontroller that can be connected to a smart phone and can allow a user to send and receive information from a lamp safe system.

13 Claims, 20 Drawing Sheets

(51) Int. Cl.
*F21S 6/00* (2006.01)
*E05G 1/026* (2006.01)
*E05B 47/00* (2006.01)
*H05B 37/02* (2006.01)
*E05G 1/10* (2006.01)
*F21V 33/00* (2006.01)
*A47B 81/00* (2006.01)

(52) U.S. Cl.
CPC ............... *E05G 1/026* (2013.01); *E05G 1/10* (2013.01); *F21S 6/003* (2013.01); *F21V 33/0048* (2013.01); *H05B 37/02* (2013.01); *A47B 81/005* (2013.01); *E05B 2047/0013* (2013.01); *E05B 2047/0087* (2013.01); *E05B 2047/0095* (2013.01); *E05B 2047/0096* (2013.01)

(58) Field of Classification Search
USPC ........ 109/23, 38, 39, 45, 47, 50, 52, 54, 57, 109/58, 58.5, 59 R
See application file for complete search history.

(56) References Cited

U.S. PATENT DOCUMENTS

| | | | | |
|---|---|---|---|---|
| 3,239,294 A * | 3/1966 | Lammeyer | ............. | A47B 85/00 254/122 |
| 3,999,493 A * | 12/1976 | Gulya | ...................... | E05G 1/00 109/23 |
| 4,022,137 A * | 5/1977 | Chiu | ........................ | E05G 1/10 109/44 |
| 4,123,978 A * | 11/1978 | Lentini | ..................... | E05G 1/00 109/51 |
| 4,244,303 A * | 1/1981 | Kurasik | ................... | A47G 1/06 109/23 |
| 4,369,717 A * | 1/1983 | Bollier | ...................... | E05G 1/00 109/45 |
| 4,625,658 A * | 12/1986 | Hodges | ..................... | E05G 1/00 109/35 |
| 5,048,901 A * | 9/1991 | DeBlaay | ................ | A47B 17/04 312/204 |
| 5,066,079 A * | 11/1991 | Lawrence | ................ | E05G 1/00 109/54 |
| 5,203,619 A * | 4/1993 | Welsch | ................ | B65G 1/0464 312/242 |
| 5,372,076 A * | 12/1994 | Solt | ........... | E05G 1/00 109/22 |
| 5,944,396 A * | 8/1999 | Stephan | ................ | A47B 88/80 312/204 |
| 6,135,034 A * | 10/2000 | Clark | ....................... | E05G 1/00 109/45 |
| 6,851,770 B2 * | 2/2005 | Canedy | .................... | A47F 3/002 312/114 |
| 8,047,619 B2 * | 11/2011 | Amstutz | ................. | A47F 3/002 312/117 |
| 9,091,111 B2 * | 7/2015 | Popwell | .................... | E05G 1/10 |
| 9,145,728 B1 * | 9/2015 | LeBlanc | ................. | E05G 1/024 |
| 2016/0145929 A1* | 5/2016 | Adrain | .................... | E05G 1/026 109/50 |

\* cited by examiner

Element 80 was changed to 160

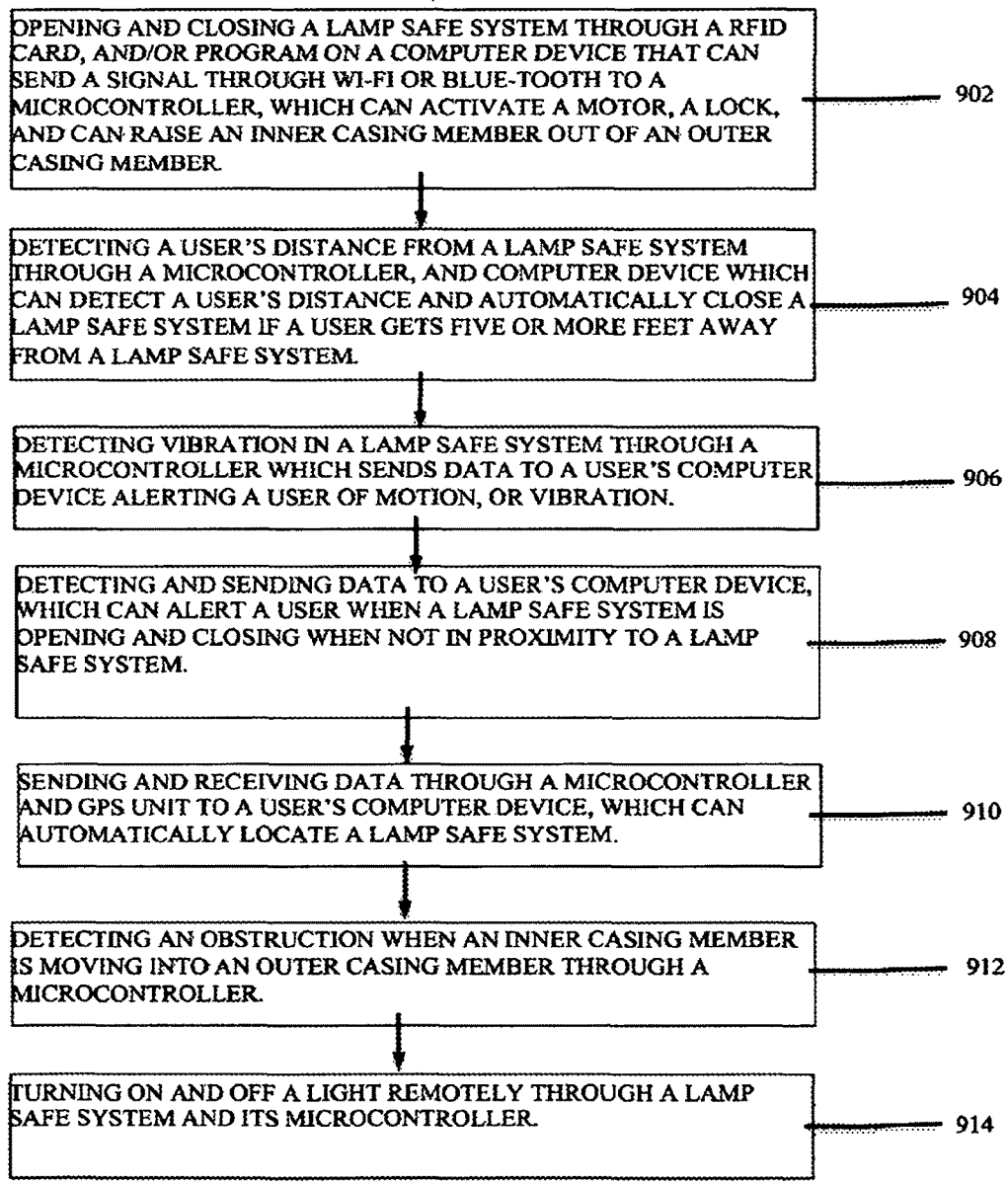

LAMP SAFE SYSTEM

CROSS-REFERENCE TO RELATED APPLICATIONS

This application claims benefit from currently pending U.S. Provisional Application No. 62/376,009 titled "Lamp Safe System" and having a filing date Aug. 17, 2016, all of which is incorporated by reference herein.

TECHNICAL FIELD

The present specification relates to a lamp safe system for storing personal items such as guns, jewelry, coins, birth certificates, or other personal items in a safe that looks and functions like a lamp.

BACKGROUND

Various types of devices for storing items safely are known in the art. Usually items such as guns, coins, jewelry, and other valuable personal items can be stored in a safe or a gun box. Typically, a safe is big and bulky that sits in a closet, out in the open that is visible for all to see, hidden in a wall or floor, or hidden in a bookshelf. In addition, a safe can be a small metal or wood container, which lies in the open for anyone who knows its location, which allows for the safe to be easily taken. Usually, a safe's only safety feature is a digital keypad or mechanical dial or keypad, and locking mechanism. Some safes can be bolted to the floor or a wall leaving huge holes in the floor or wall once the safe is removed. Other safes have biometric locks, while other have GPS, or some other type of locating device.

Current technologies include either small or large safes that sit in the open or are hidden that require extensive installation techniques to put into a user's home or place of business. Furthermore, thieves are looking for these types of safes and can easily break into the safes without the owner ever knowing that his/her safe is being stolen, broken into, or tampered with. There is a need for a safe that can be out in the open without anyone knowing that the safe is there, to allow a user to know when the safe is being tampered with, and allow a user to quickly access it in case of an emergency.

SUMMARY

Aspects disclosed herein relates to a lamp safe system for storing items in a safe that can be hidden in a hollow body and function like an item that it is hidden in, such as a lamp. A lamp safe system can have a lamp body member that can surround an outer casing and inner casing. A lamp body can be removably connected to the outer casing member and a lamp body can be interchangeable, and it can be connected to an outer casing to suit a user's preference in design and look. An outer casing can consist of an inner wall, an outer wall, a top component, and a bottom component. An outer casing member's bottom component can be enclosed or have one or more openings. In addition, an outer casing member can have one or more through holes for bolts to removably connected to a base member.

In embodiments a lamp safe system can have an inner casing. An inner casing can be connected to an outer casing member by a moving member. An inner casing member can have a top section, a base section, and two or more side sections. An inner section and a base section can be parallel to each other, co-radial to each other, and can be attached to two or more side sections, back section, and middle section.

An inner section member can be connected to a moving member by a lead screw nut, lead screw, and linear guide rod. A base section can have a first and a second lead screw nut attached to it which can be attached to a moving member.

A moving member can have a first lead screw and a second lead screw connected to a first lead screw nut and a second lead screw nut. A first lead screw and a second lead screw can be attached first timing pulley, second timing pulley. A first belt and a second belt can link between a first timing pulley, second timing pulley to a third timing pulley, and fourth timing pulley, and a first and second motor. An inner casing member can move in and out of an outer casing as a first and second motor rotate a first and second lead screw through a first, second, third, and fourth timing pulley which can be attached together through belt to a lead screw which can rotate and guide a lead screw nut which is attached to an inner casing member.

A plurality of drawers can be slid into a plurality of slots and can removably attached. A plurality of drawers can slide in and out with respect to either the first wall and middle wall or a second wall and a third wall. A plurality or drawers or more than one drawer can be removed from the inner casing to give more space within an inner casing's storage compartment. An outer casing member can enclose an inner casing member and a moving member. An outer casing can attach to a inner casing through a moving member.

A base member can attach to an outer casing member, and can have a battery attached to it, electrical components or an electrical system attached to its inner surface such as, for example, an vibration sensor, a global position system ("GPS"), a RFID module, a microprocessor, a transmitting device, a microphone, a biometrics reader, a locking mechanism, a Wi-Fi device, a USB ports, a Bluetooth, a wireless data exchange, a iBeacon, or the like. In embodiments an outer casing's outer surface can have a plurality of outer body attachment devices, which can removably connect a lamp body to it. A lamp body can be interchangeable with plurality of lamp bodies to customize a design to a user's preference.

A "smart" phone and/or tablet, and/or computer can control a microcontroller through an application, which can turn on and off a motor, can turn on and off a light source, can send alerts to a user such as, for example, vibration detection, video imaging, light source status, status of lamp safe system, when a lamp safe system is being accessed, a GPS location of a lamp safe system, and it can detect proximity from the lamp safe system. A lamp safe system can be powered by a direct current or by alternating current power supply. A battery or an alternating current power supply can power its electrical components such as, for example, a lock, an vibration sensor, microprocessor, transmitting device, microphone, biometrics reader, locking mechanism, Wi-Fi device, USB ports, GPS, wireless data exchange, iBeacon, or the like, which can make up an electrical system. If an alternating current power supply is disconnected a battery can power its electrical components.

Additional features and advantages of the present specification will become apparent to those skilled in the art upon consideration of the following detailed description of the illustrative embodiment exemplifying the best mode of carrying out the invention as presently perceived.

BRIEF DESCRIPTION OF THE DRAWINGS

These and other features, aspects, and advantages of the present specification will become better understood with regard to the following description, appended claims, and accompanying drawings where:

FIG. 20 is a block diagram of an exemplary method of use of a lamp safe system, in accordance with one or more embodiments.

DETAILED DESCRIPTION

The embodiments of the invention described herein are not intended to be exhaustive or to limit the invention to precise forms disclosed. Rather, the embodiments selected for description have been chosen to enable one skilled in the art to practice the invention.

Generally, an embodiment in accordance with the invention can comprise a lamp safe system that includes an inner casing member that can move into and out of an outer casing member and a lamp body. Embodiments can further include a moving member that can be permanently or removably attached to an inner casing member and an outer casing member. A moving member can move an inner casing member in and out of an outer casing member and a lamp body. In other embodiments a lamp body can be omitted. Furthermore, embodiments can include an electronic controller member, which can command or control electrical components such as a motor, a switch, a vibration sensor, a Blue-Tooth device, a Wi-Fi device, and a Global Positioning System ("GPS"), a light source, and send and receive data from a computer device. In addition, a lamp body can be removably attached to an outer casing member where a lamp body can be removed and replaced by a user with another size or shape lamp body.

Figure 1:
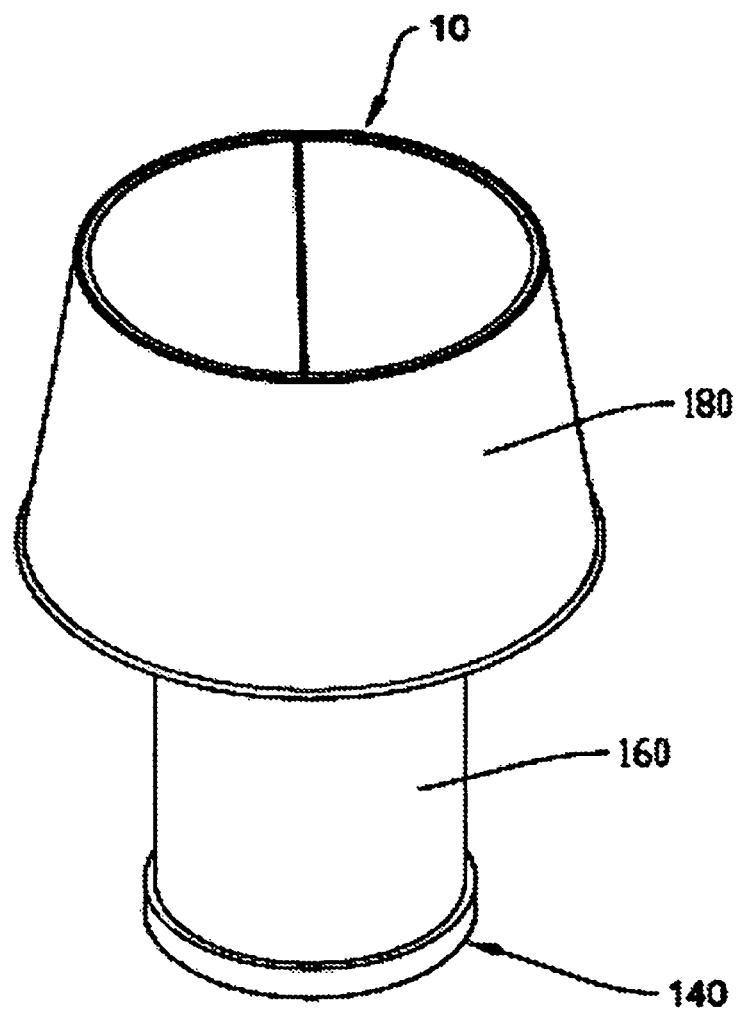
FIG. 1 shows a isometric front view of a lamp safe system in its closed state in accordance to one, or more embodiments.
Figure 2:
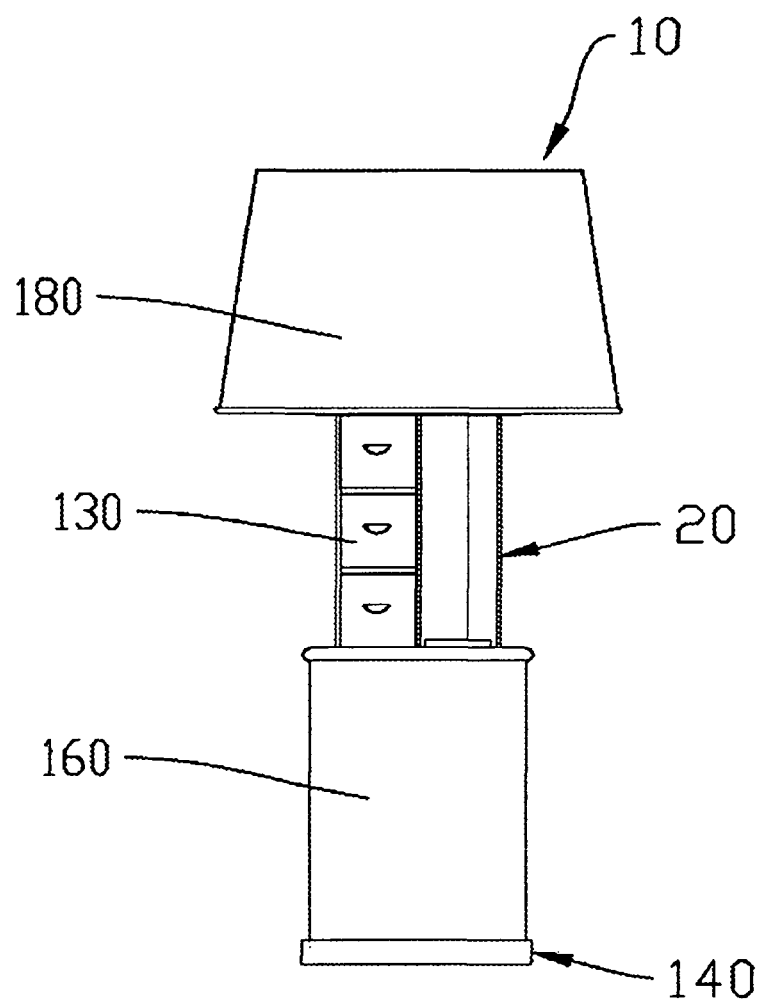
FIG. 2 shows a front view of a lamp safe system in its open state in accordance to one, or more embodiments.
Figure 3:
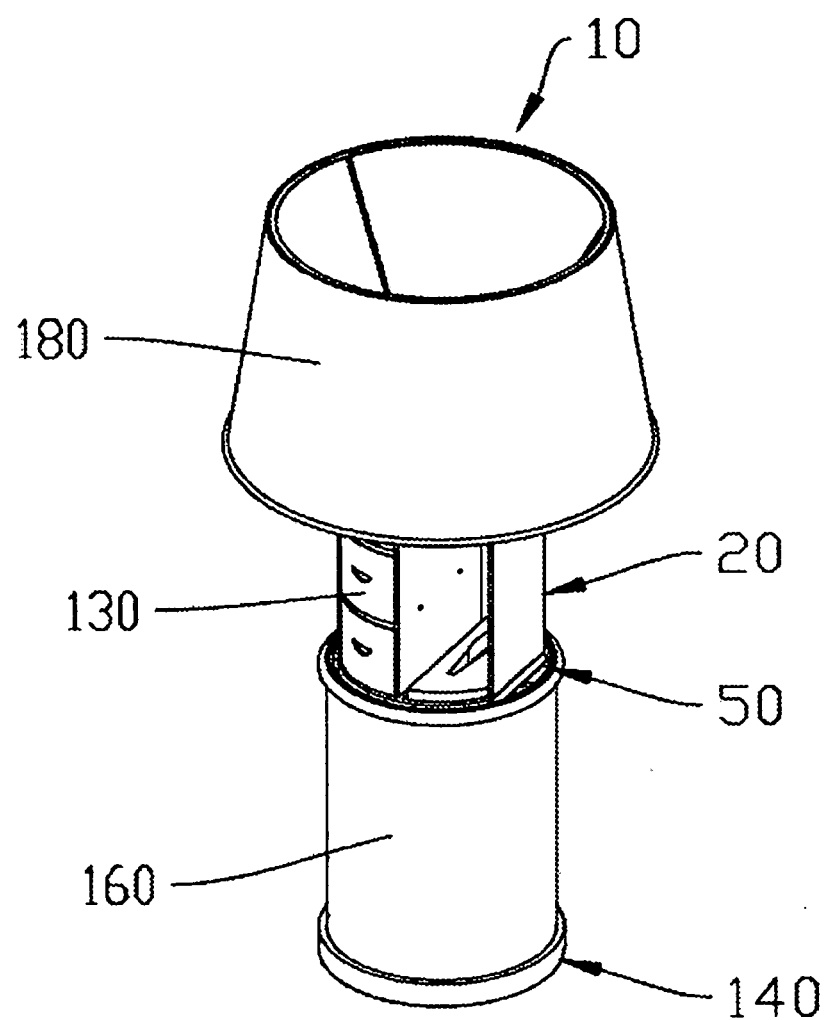
FIG. 3 shows a isometric front view of a lamp safe system in its open state in accordance to one, or more embodiments.

Referring initially to FIG. 1, FIG. 2, and FIG. 3, showing an isometric view of lamp safe system in its closed state, a front view of a lamp safe system in its open state, and a isometric view of a lamp safe system in its open state which is shown generally at 10. Embodiments include an inner casing member 20, an outer casing member 50, a moving member 60 (not shown), a lamp body 160, a base member 140, one or more drawers 130, a lampshade 180, and a light source 150 (not shown).

Referring to FIG. 4, FIG. 5, FIG. 6, FIG. 7, and FIG. 8 a front exploded view, an isometric exploded view, a front view, and a side view with a lamp body, an outer casing member omitted of a lamp safe system in its closed state, and isometric view with a lamp body, an inner casing member, and an outer casing member omitted. In embodiments an inner casing member 20 can comprise an inner casing top section 22, two or more side sections 26, 28, 36, and 38 (not shown), a back section 30, a middle section 32, a base section 24, and, in certain embodiments a spacer 42. An inner casing top section 22 and a base section 24 can be parallel to each other and can be removably or permanently attached to two or more side sections 26, 28, 36, and 38 (not shown), a back section 30, a middle section 32, a base section 24, and in certain embodiments a spacer 42. In certain embodiments a spacer 42 can be omitted, and the In embodiments, an inner casing top section 22 can have a top surface, a bottom surface, and one or more outside walls with a thickness of such as, for example, at least 0.064, at least 0.080, at least 0.094, 0.125, at least 0.160, at least 0.25, at least 0.313, or the like. An inner casing top section's 22 outside wall can be a thickness of such as, for example, at most 0.064, at most 0.080, at most 0.094, 0.125, at most 0.160, at most 0.25, at most 0.313, or the like. An inner casing top section 22 can be circular, square, rectangular, hexagonal, or the like. An inner casing member's 20 top section 24 outside wall can have a chamfered edge around its lower edge outside perimeter, or it can have a straight section with a chamfered lower section around its perimeter. An inner casing top section 22 can have a thru hole centered or off center to allow for wiring from a light source 150. An inner casing top section 22 can have a thru hole that can be such as, for example, at least 0.063, at least 0.08, at least 0.10, at least 0.125, at least 0.135, at least 0.145, at least 0.250, or the like in diameter. An inner casing top section 22 can have a thru hole that can be such as, for example, at most 0.063, at least 0.08, at most 0.10, at most 0.125, at most 0.135, at most 0.145, at most 0.250, or the like in diameter. In addition, an inner casing top section 22 can have one or more channels with a depth of at least, or at most half its width on its bottom surface for a light source's 150 wiring and/or a RFID module 178 wiring. In certain embodiments an inner casing top section 22 can have a thru hole to allow for an RFID module 178 to sit on an inner casing top section's top surface. A top enclosure (not shown) can attach to an inner casing top section 22 and cover an RFID module 178. A top enclosure (not shown) can be plastic, rubber, delrin, or the like to allow for an RFID signal to be sent and received from a user and a RFID module 178.

An inner casing member's 20 top section 22 and a base section 24 can be centered and/or co-radially positioned to each other. In embodiments an inner casing top section 22 and a base section 24 can be separated by two or more side sections 26, 28, 36, and 38 (not shown), a back section 30, a middle section 32, and in certain embodiments a spacer 42. Two or more side sections 26, 28, 36, and 38 (not shown), a back section 30, and a middle section 32 can be removably or permanently attached to and extend perpendicular from a inner casing top section 22 to a base section 24. In certain embodiments two or more side sections 26, 28, 36, and 38 (not shown), a back section 30, and a middle section 32 can be combined to form one section, two sections, three sections, four sections, five sections, six sections, or the like, by bending, welding, or the like forming one section, two sections, three sections, or the like. Two or more side section, a back section, and middle section can be combined to form one piece, and then can be bent to form the resulting section of the inner casing.

In embodiments, a base section 24 can have a top surface and a bottom surface and one or more outside walls with a thickness of such as, for example, at least 0.064, at least 0.080, at least 0.094, 0.125, at least 0.160, at least 0.25, at least 0.313, or the like. A base section 24 outside walls can have a thickness of such as, for example, at most 0.064, at most 0.080, at most 0.094, at most 0.125, at most 0.160, at most 0.25, at most 0.313, or the like. A base section 24 can be perpendicular and can be removably or permanently attached to two or more side sections 26, 28, 36, and 38 (not shown), a back section 30, and a middle section 32. In certain embodiments a base section 24 can be permanently or removably attached to a spacer 42. A base section 24 can be circular, square, rectangular, hexagonal, or the like.

In embodiments a middle section 32 can be substantially centered on a inner casing top section 22 and a base section 24, and substantially in-between two side sections 26, 36. A middle section 32 can extend perpendicularly from a back section to about a front edge of a top section. A middle section 32 can be removably or permanently attached to a back section 30, a base section 24, and a top section 22. In certain embodiments a middle section can be omitted. In certain embodiments a middle section 32 can be omitted, and/or one or more side sections 26, 28, 36, and 38 (not shown) can be omitted, and/or a back section 30 can be omitted. In certain embodiments a base section 24 can be permanently or removably attached to a spacer 42. A spacer 42 can be removably or permanently attached to a base section 24, and it can have one or more slots cut vertically through its top and bottom face, or it can be a solid piece. A spacer's 42 top face can be removably or permanently attached to two or more side sections 26, 28, 36, and 38 (not shown), back section 30, and middle section 32.

In certain embodiments, an inner casing member 20 can be aluminum, stainless steel, bronze, inconel, plastics, acrylonitrile butadiene styrene ("ABS"), forged metal, casted metal, carbon steel, high temperature plastics, delrin, or the like. A inner casing top section 22 and a base section 24, two or more side sections 26, 28, 36, and 38 (not shown), a back section 30, a middle section 32, and in certain embodiments a spacer 42 can be combined into one piece, two pieces, three pieces, four pieces, five pieces, six pieces, or the like, and it can be made by welding, sand casting, plaster mold casting, shell molding, investment casing, waste molding of plaster, evaporative-pattern casting, closed-die forging, stamped, or the like.

In embodiments a side section 36 and a middle section 32 can have one or more shelve sections 34 protruding horizontally between the two sections. One or more shelve sections 34 can be removably or permanently attached to a side section 36 and a middle section 32. A shelve section 34 can attach to a side section 36 and a middle section 32 by such as, for example, bolted on, set on with set two or more set pins, welded, casted, or the like. In certain embodiments there can be one shelve section, two shelve sections, three shelve sections, four shelve sections, five shelve sections, or the like attached between a middle section 32 and a side section 36, or between two side sections 26, 36.

In embodiments a locking block 40 can be removably and permanently attached to and extend perpendicularly from a base section's 24 bottom surface. A locking block 40 can be attached by such as, for example, bolting, welding, threading, tack welding, riveting, brazing, gluing, spot welding, or the like. A locking block's 40 front and back surfaces can have a thru hole to allow a locking mechanism 117 to engage the thru a hole and hold an inner casing member 20 into an outer casing member 50. A locking block can be such as, for example, circular, square, rectangular, hexagonal, or the like in shape. A locking mechanism 117 can be such as, for example, a solenoid lock, electronic switch, electro magnetic lock, electric latch, deadbolt, mechanical locks, or the like.

In certain embodiments a gun holder 44 can be positioned in between a side section 26, and a middle section 32. A gun holder 44 can be foam, plastic, rubber, stainless steel, carbon steel, or the like with a slit or a barrel plug to hold the gun's barrel, and to hold the gun upright, a gun holder can pivot on an axis and drop down as the inner casing lifts out of the outer casing. In certain embodiments a gun holder 44 can be a holster that can fit in between a side section 26 and a middle section 32, and can drop down when an inner casing member 20 moves out of an outer casing member 50, and can retract when an inner casing member 20 moves into an outer casing member 50. A gun holder 44 can be pivotally attached in-between a side section 26, and a middle section 32 by such as, for example, pivot pins, dowel pins, cams, bolts, swivel pads, glides, or the like.

In embodiments an inner casing member 20 can move in and out of an outer casing member 50 by a moving member 60. An outer casing member 50 can have an inner wall, an outer wall, a base member 140, and a top component 53. An inner wall and outer wall can extend perpendicularly from a base member 140. A top component 53 can lay flat on the outer casing 50 when the inner casing is closed in the outer casing, and raises up with the inner casing. An inner wall to an outer wall can have a thickness of such as, for example, at least 0.064, at least 0.080, at least 0.094, 0.125, at least 0.160, at least 0.25, at least 0.313, or the like. An inner wall 56 to an outer wall 54 wall can have a thickness of such as, for example, at most 0.064, at most 0.080, at most 0.094, 0.125, at most 0.160, at most 0.25, at most 0.313, or the like. An outer casing member 50 can be hollow with an open top component 53, and a closed bottom component 52 that can be perpendicular to an inner wall and an outer wall. An outer casing member 50 can enclose and/or surround an inner casing member 20, and a moving member 60. An outer casing member can be such as, for example, at least 4 inches, at least 5 inches, at least 6 inches, at least 7 inches, at least 8 inches, at least 9 inches, at least 10 inches, at least 11 inches, at least 12 inches, at least 13 inches, at least 14 inches, or the like in height. An outer casing member 50 can be such as, for example, at most 4 inches, at most 5 inches, at most 6 inches, at most 7 inches, at most 8 inches, at most 9 inches, at most 10 inches, at most 11 inches, at most 12 inches, at most 13 inches, at most 14 inches, or the like in height. An outer casing 50 can have a plurality of threaded holes on its inner wall, which can be either blind holes or thru holes. A plurality of threaded holes can support a micro switch (not shown), and a first linear guide rod support 82 and a second linear guide rod support 108, which can be removably attached to an outer casing member's 50 inner wall through the plurality of holes by such as, for example, bolts, screws, pins, rods, weld, glue, or the like.

A top component 53 can be the same thickness of an inner wall to outer wall thickness. A top component 53 thickness can be such as, for example, at least 0.064, at least 0.080, at least 0.094, 0.125, at least 0.160, at least 0.25, at least 0.313, or the like. A top component 58 thickness can be of such as, for example, at most 0.064, at most 0.080, at most 0.094, at most 0.125, at most 0.160, at most 0.25, at most 0.313, or the like. A top component 53 can be chamfered on its inner edge, and/or the inner wall's upper edge. In certain embodiments a top component 53 can have a flange that can project off of an inner wall toward the center axis of a top component. A top component's 53 flange can be such as, for example, at most 0.01 inch, at most 0.05 inch, at most 0.075 inch, at most 0.1 inch, at most 0.125 inch, at most 0.20 inch, at most 0.225 inch, at most 0.30 inch, or the like off of the inner wall 56 towards the top component's inside axis. A top component's flange can be such as, for example, at least 0.01 inch, at least 0.05 inch, at least 0.075 inch, at least 0.1 inch, at least 0.125 inch, at least 0.20 inch, at least 0.225 inch, at least 0.30 inch, or the like off of the inner wall towards the top component's inside axis. A top section's flange can be recessed into an outer casing and it can sit flush with an outer casing's top edge, or it can be above the outer casing top edge.

In certain embodiments, an outer casing member 50 can have a chamfer along a top component's 53 inner wall's edge. A inner casing member's top component outside wall chamfer can fit inside of an outer casing member's 50 inner wall's top edge chamfer, and can be a loose fit. A bottom component 52 can be removably attached to a base member 140 by such as, for example, bolts, screws, threading, riveting, or the like. An outer casing member 50 can be circular, square, rectangular, hexagonal, or the like in shape.

In embodiments an outer casing member's 50 bottom component 52 can have a plurality of slots 51, a first motor thru hole 53 and second motor thru hole 55, a plurality thru holes or blind holes for mounting a first lead screw 62 and second lead screw 94 and a first linear guide rod 76 and second linear guide rod 112 and a thru hole for electrical components wiring. In addition, a bottom component 52 can have mounting holes for a backup battery, and for a locking mechanism 117 on its top surface. An outer casing member 50 can have a one or more connection points for a lamp body 160 to attached to. One or more connection points can be on an outer casing member's 50 outer wall 54, a bottom component 52, and/or a top component 58. One or more connections points can be such as, for example, slots, threaded holes, keyholes, pins, or the like to removably connect a lamp body 160 to an outer casing member 50. A base member 140 can have a plurality of thru holes 59 to removably connect an outer casing member 50 to a bottom component 52. An outer casing member 50 and a base member 140 can be connected to a bottom component 52 by such as, for example, bolting, pinning, screwing, keying, gluing, welding, or the like forming a complete outer casing body.

In embodiments a moving member 60 can comprise a first lead screw 62 and a second lead screw 94; a first lead screw nut 64 and a second lead screw nut 106; a first motor 72 and a second motor 102; a first timing pulley 68, second timing pulley 90, third timing pulley 96, and fourth timing pulley 104; a first belt 74 and a second belt 100; a first belt pulley bearing support 66 and a second belt pulley bearing support 98; a first linear guide rod 76 and a second linear guide rod 112; a first linear guide block 80 and a second linear guide block 114; a first sleeve bearing 84 and a second sleeve bearing 110; and a first linear guide rod supports 82 and a second linear guide rod supports 116. An inner casing member's 50 base section 24 can be removably or permanently attached to a moving member 60 by a first lead screw nut 64 and second lead screw nut 106, a first sleeve bearing 84 and second sleeve bearing 110, a first linear guide 76 and second linear guide 112, a first linear guide support 82 and second linear guide support 116, and a first linear guide block 80 and second linear guide block 114. A first lead screw nut 64 and second lead screw nut 106 can be connected to a base section 24 by a weld, bolts and nuts, snap rings, bolts and threaded holes, or it can be casted into a base section as one piece.

In embodiments a first lead screw 62 and a second lead screw 94 can be perpendicular to a first lead screw nut 64 and a second lead screw nut 106, and as the first lead screw and second lead screw rotate the first lead screw nut and second lead screw nut can move axially along the lead screws' axis transitioning the lead screw nuts from one place to another place as the lead screw directions changes. A first linear guide support 82 and a second linear guide support 116 can be removably or permanently attached to a base section 24, and a linear guide blocks 80. A first linear guide support 82 and second linear guide support 116 spaces apart a base section 24, and a first linear guide block 80 and a second linear guide block 114. A first linear guide support 82 and a second linear guide support 116 can separate a first linear guide block 80 and second linear guide block 114 from a base section 24 by at least 0.125 inches, at least 0.250 inches, at least 0.50 inches, at least 0.750 inches, at least 0.825 inches, at least 1.00 inches, at least 1.25 inches, at least 1.50 inches, at least 1.75 inches, at least 2.00 inches, or the like. A linear guide support 82 can separate a linear guide block 80 from a base section 24 by at most 0.125 inches, at most 0.250 inches, at most 0.50 inches, at most 0.750 inches, at most 0.825 inches, at most 1.00 inches, at most 1.25 inches, at most 1.50 inches, at most 1.75 inches, at most 2.00 inches, or the like. A lead screw 62 and 94 can be such as, for example, acme screw, ball screw, roller screws, worm drives, rack and pinion, electromagnetic actuation, jack screw, or the like.

A first sleeve bearing 84 and second sleeve bearing 110 can be connected to a base section 24 and/or a linear guide block 80 by such as, for example, weld, press fit, bolted, or the like. A sleeve bearing can be such as, for example, a sleeve bearing, mounted bearing, a linear bearing, drill bushing, or the like. A first linear guide rod 76 and second linear guide rod 112 can be removably or permanently connected to an outer casing member's 50 bottom component 52 by threaded holes, weld, braze, bolt, or the like, and removably or permanently connected to a first linear guide rod support 82 and a second linear guide rod support 108 by loose fit, press fit, bolted, or the like. A first linear guide rod 76 and second linear guide rod 112 can be connected to an outer casing bottom component 52 by being such as, for example, screwed, welded, bolted, or the like. A first linear guide rod 76 and second linear guide rod 112 can be such as, for example, circular, square, rectangular, hexagonal in shape, and can be at least 2 inches long, at least 3 inches long, at least 4 inches long, at least 5 inches long, at least 6 inches long, at least 7 inches long, at least 8 inches long, at least 9 inches long, at least 10 inches long, at least 11 inches long, at least 12 inches long, at least 13 inches long, or the like. A first linear guide rod 76 and second linear guide rod 112 can be such as, for example, at most 2 inches long, at most 3 inches long, at most 4 inches long, at most 5 inches long, at most 6 inches long, at most 7 inches long, at most 8 inches long, at most 9 inches long, at most 10 inches long, at most 11 inches long, at most 12 inches long, at most 13 inches long, or the like. A first linear guide rod 76 and second linear guide rod 112 can be such as, for example, at least 0.063 inch in diameter, at least 0.080 inch in diameter, at least 0.125 inch in diameter, at least 0.175 inch in diameter, at least 0.250 inch in diameter, or the like. A first linear guide rod 76 and second linear guide rod 112 can be such as, for example, at most 0.063 inch in diameter, at most 0.080 inch in diameter, at most 0.125 inch in diameter, at most 0.175 inch in diameter, at most 0.250 inch in diameter, or the like.

A first lead screw 62 can be connected to a first timing pulley 92, and a first belt pulley bearing support 90, which can be linked to a second pulley 68 by a first belt 74. A second timing pulley 68 can be connected to a first motor 72 by the motor's shaft. A second lead screw 94 can be connected to a third timing pulley 96, and second belt pulley bearing support 98, which can be linked to a fourth timing pulley 104 by a second belt 100. A fourth timing pulley 104 can be connected to a second motor 102 by the motor's shaft. A timing pulley can be connected to a motor's shaft by a press fit, a set screw, a loose fit, or the like. A first motor 72 and second motor 102 can be connected to an outer casing's bottom component 52 through a plurality of slots, which can allow for a belt to be tightened if it becomes loose during use.

In embodiments, an outer casing bottom component 52 can have a plurality of thru holes which can permanently or removably attach a first motor 72 and a second motor 102, a first belt pulley bearing support 90 and a second belt pulley bearing support 98, and a first linear guide rod 76 and second linear guide rod 112. An outer casing bottom component 52 can have attachment points such as thru holes, threaded holes, pin holes or the like for a locking mechanism 117. In certain embodiments a first linear guide support 82, and a second linear guide support 116, a first linear block 80 and a second linear block 114 can be integrated as one piece into a base section 24 extending perpendicularly from a base section's bottom surface.

In embodiments, an outer casing member's 50 and base member 140 can be removably connected to a bottom component 52. A base member 140 can have an inner diameter 142 and an outer diameter 144 which can create a wall thickness and a top 148, and a bottom 146. A base member's bottom 146 and/or bottom component 52 can have a plurality of electrical attachment points for such as, for example, a microcontroller 172, a Wi-Fi module 174, a GPS module 176 (not shown), and an RFID module 178. An attachment point can be a threaded hole, raised standoff, or the like. A base member 140 and/or bottom component 52 can have a plurality of threaded holes 158 on its top along its inside perimeter. A base member 140 can be such as, for example, a circle, a square, a rectangle, a hexagon, or the like in shape. A base member 140 can have a height of at least 0.125 inch, at least 0.25 inch, at least 0.75 inch, at least 0.825 inch, at least 1.0 inch, at least 1.125 inch, or the like. A base member 140 can have a height of at most 0.125 inch, at most 0.25 inch, at most 0.75 inch, at most 0.825 inch, at most 1.0 inch, at most 1.125 inch, or the like.

Figure 9:
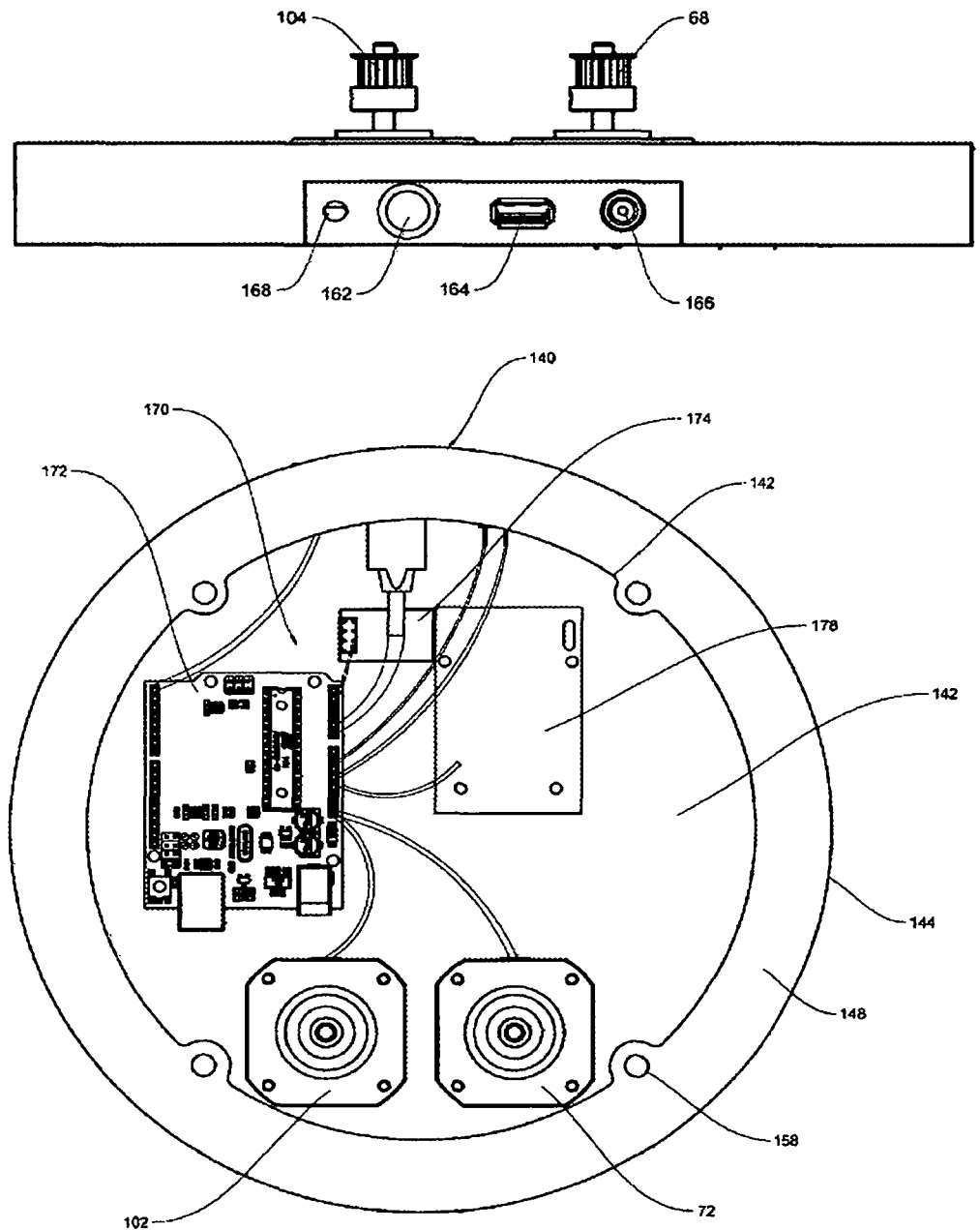
FIG. 9 shows a back and top view of a base member and electronic controller member of a lamp safe system, in accordance to one, or more embodiments.

Referring to FIG. 9, shows a top view and side view of electronic controller member and base member. In embodiments a base member 140 can have a back portion that can have a cut out, which can have thru holes for an on/off switch 162, a female USB port 164, DC barrel jack 166, and a thru hole port 168 for a Wi-Fi antenna, a GPS antenna, and a RFID coil antenna. A base member's back portion can have a cover (not shown) on it to match a base member's shape, which can have ports for a on/off switch 162, a female USB port 182, DC barrel jack 184. An RFID antenna can be hidden behind a cover (not shown). A cover (not shown) can be plastic, rubber, acrylic, or the light to allow for a Wi-Fi antenna, a GPS antenna, and a RFID coil antenna signal to penetrate and a Wi-Fi module 150, a GPS module 152 (not shown), and an RFID module 154 can receive the signal.

In certain embodiments a base member 140 can have an access port in its bottom, and can have a cover that can lock into place and can only be accessed by a key, which can give a user access to a motor, and electronics. An access port can allow a user to raise and lower one or more motors, and/or control electronic controller members. A base member 140 can have a hole for a magnet (not shown) to be removable attached to the base member 140. A magnet can be an electro-magnet, rare-earth magnet, permanent magnet, or the like. In certain embodiments a magnet (not shown) can have an on/off switch located on an outer casing's member or base member. An electromagnet can be attached to a battery and to a power supply that can be plugged into a wall socket. A battery can power a magnet during a power outage, such that the magnet can stay active and attached to and connected through an armature a nightstand or desk during a power outage. A magnet can have an armature that can be on the opposite side of a desk or nightstand's wall that when a magnet is active, the armature and magnet hold the safe assembly tightly onto the desk or nightstand's top. In certain embodiments a base member 140 can be omitted and a microcontroller 172, a Wi-Fi module 174, a GPS module 176 (not shown), a motor, and an RFID module 178 can be located in an outer casing member 50.

In embodiments an electronic controller member 170 can comprise a microcontroller 172, a Wi-Fi module 174, a GPS module 176 (not shown), a RFID module 178, on/off switch 162, a female USB port 182, a DC barrel jack 184, a Bluetooth module 190, and a thru hole port for a Wi-Fi antenna 188, a GPS antenna, and a RFID coil antenna (not shown). A backup battery 186 can be connected to a microcontroller 172 and a first and second motor 72, 102. A microcontroller 172 can send and receive data a Wi-Fi module 174, a GPS module 176 (not shown), a RFID module 178, on/off switch 162, a female USB port 182, and can send and receive data from a user through a Wi-Fi module 174, a Bluetooth module 190, a GPS module 176 (not shown), a RFID module 178, on/off switch 162, a female USB port 182. In addition, a vibration sensor (not shown) can be connected to a microcontroller. A vibration sensor can be an accelerometer, vibration sensor, or the like to detect any vibration and movement within the lamp safe system 10.

In embodiments an electronic controller member 170 can command or control electrical components such as a motor, a vibration sensor, a Wi-Fi module 174, a Bluetooth module 190, a GPS module 176 (not shown), a RFID module 178, on/off switch 162, a female USB port 182. In embodiments a microcontroller can connect to a "smart" phone thru Bluetooth, and/or Wi-Fi. A "smart" phone and/or tablet, and/or computer can control a microcontroller 172 through an application, which can turn on and off a motor, can turn on and off a light source 150, can send alerts to a user such as, for example, vibration detection, video imaging, light source status, status of lamp safe system, when a lamp safe system is being accessed, a GPS location of a lamp safe system, and it can detect proximity from the lamp safe system. In addition, a microcontroller 172 can detect whether an item gets in the way such as, for example, the drawers have not be fully closed, and/or a finger gets into the way, or the like while closing. In embodiments, an electronic controller member 170 can be powered by a direct current voltage source, and/or a alternating current voltage source.

Figure 4:
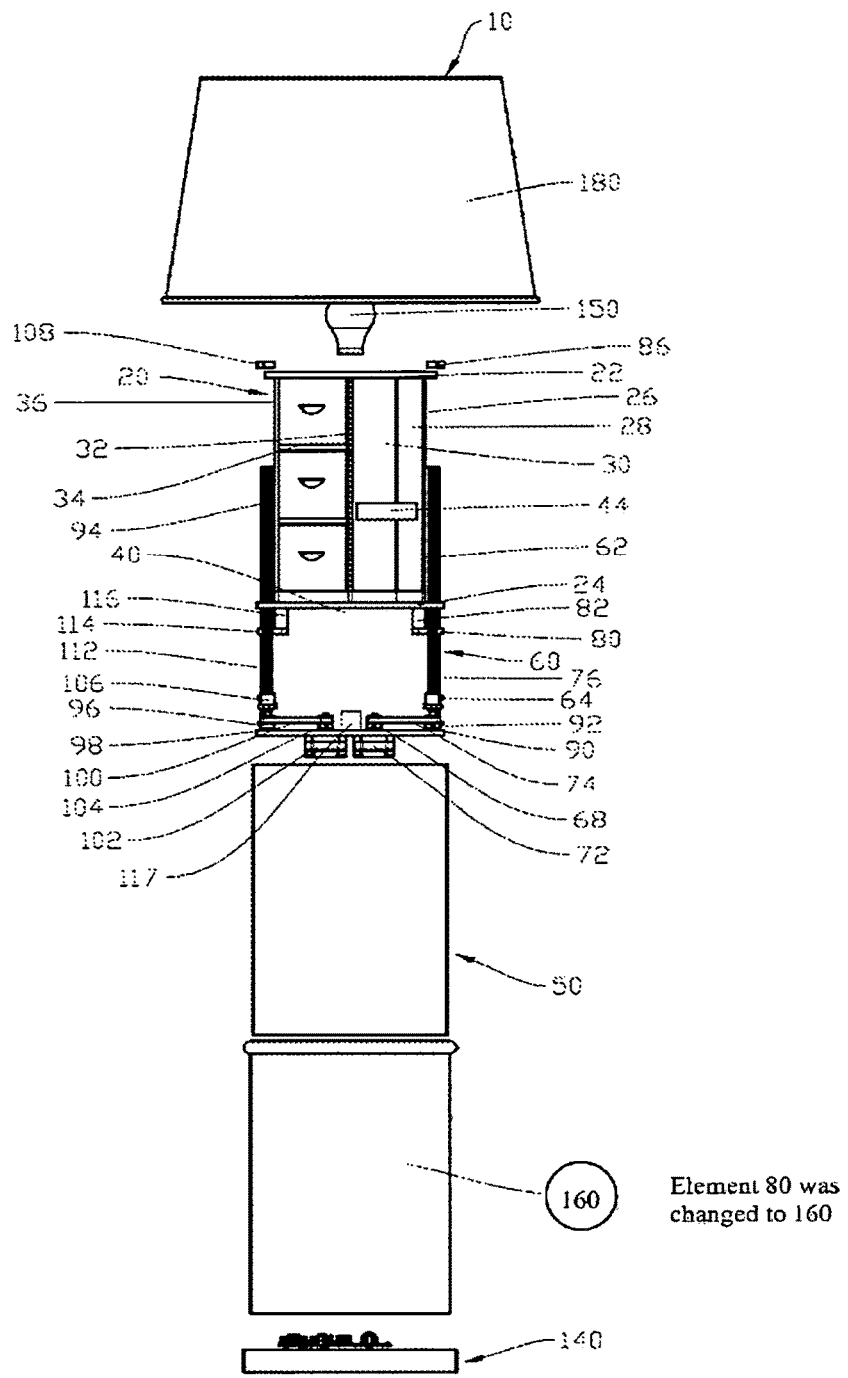
FIG. 4 shows a front exploded view of a lamp safe system, in accordance to one, or more embodiments.
Figure 5:
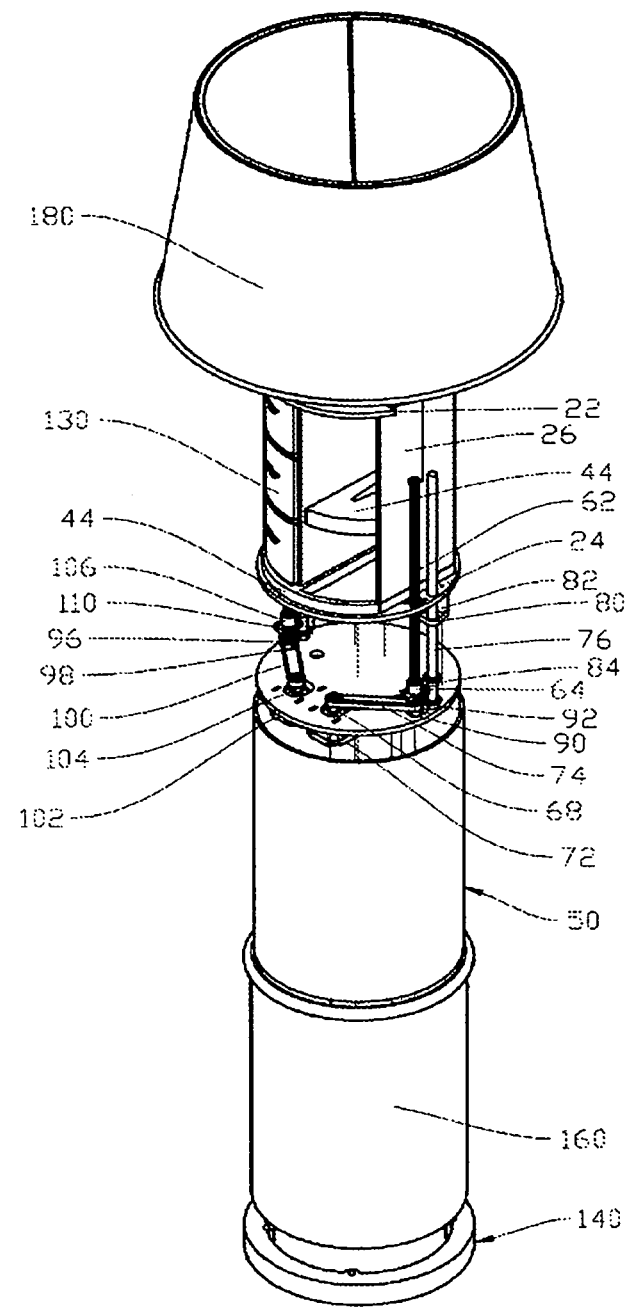
FIG. 5 shows an isometric exploded view of a lamp safe system, in accordance to one, or more embodiments.
Figure 6:
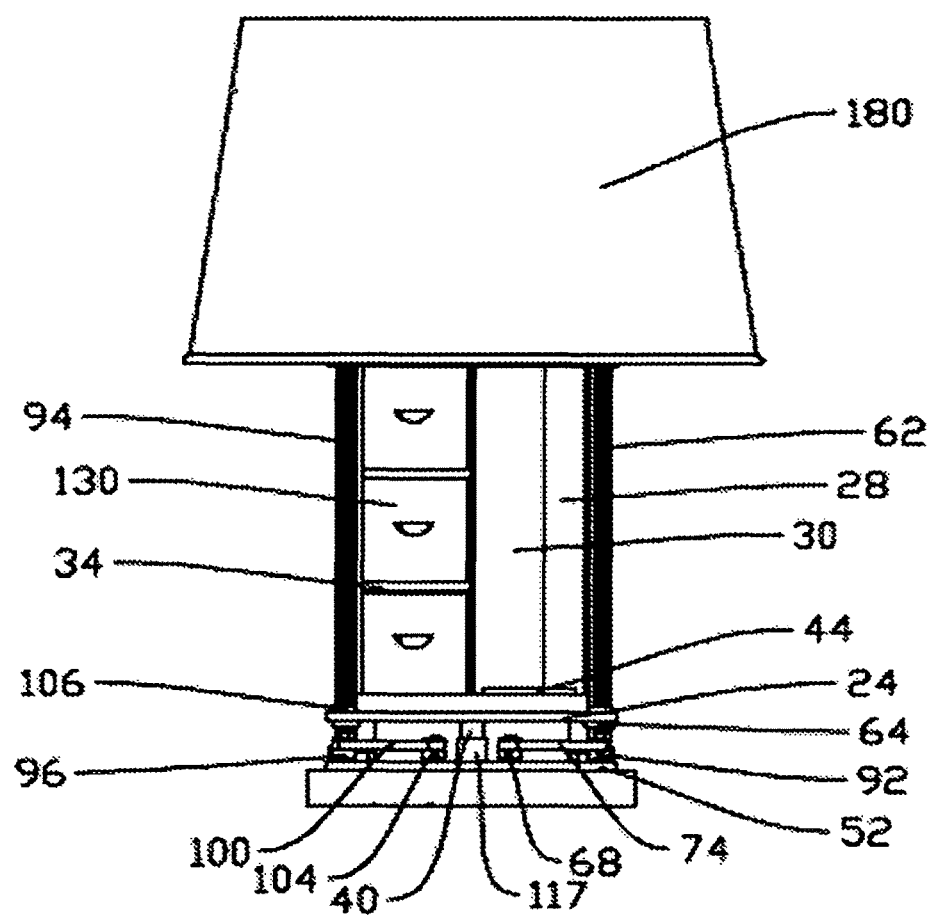
FIG. 6 shows a front view with a lamp body, and an outer casing omitted in its closed state of a lamp safe system, in accordance to one, or more embodiments.
Figure 7:
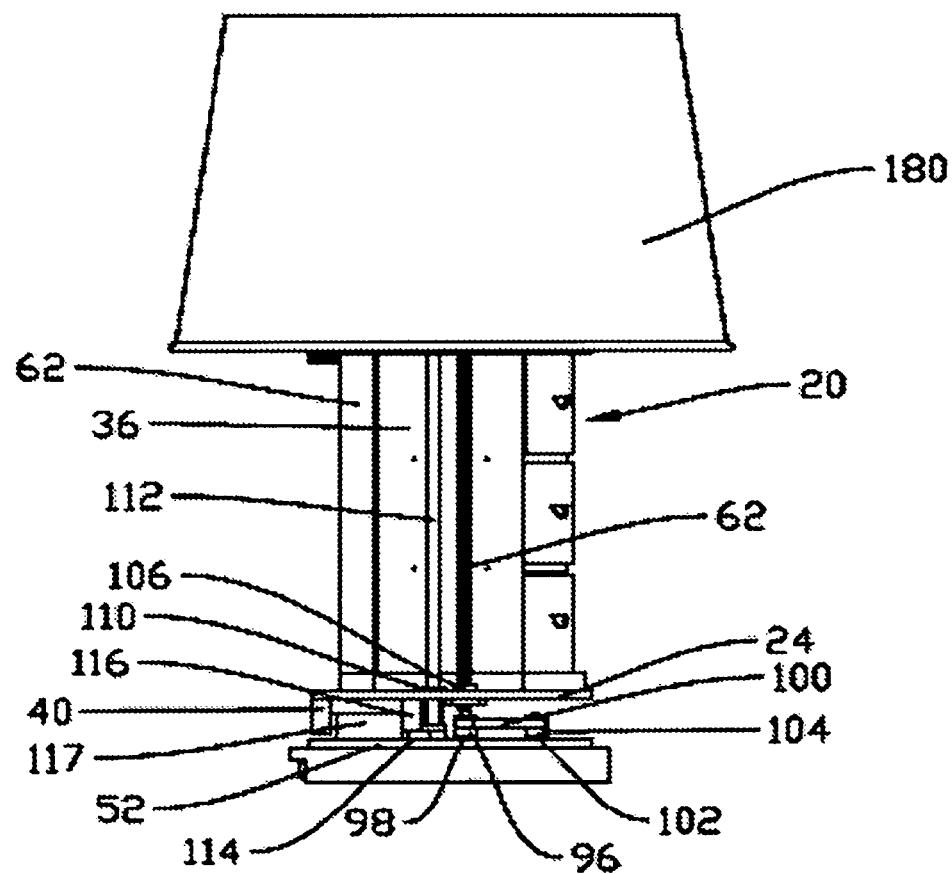
FIG. 7 shows a side view with a lamp body, and an outer casing omitted in its closed state of a lamp safe system, in accordance to one, or more embodiments.
Figure 8:
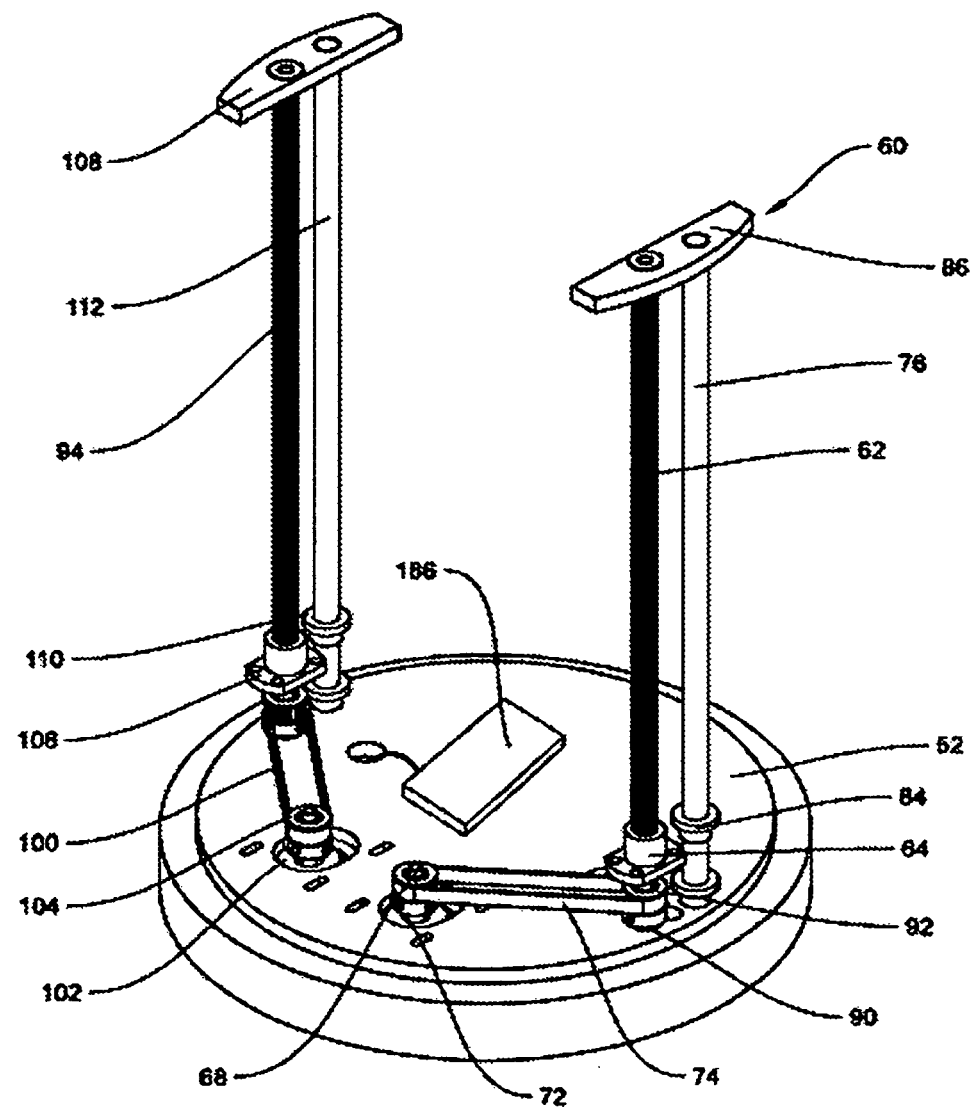
FIG. 8 shows an isometric view of with a lamp body, an outer casing, an inner casing, lampshade, and light source omitted of a lamp safe system, in accordance to one, or more embodiments.

Referring to FIG. 4 an exploded view of a lamp safe system. In embodiments a lamp safe system 10 can have a lamp body 160 which can comprise an inner diameter, and an outer diameter and a top and a bottom. A lamp body 160 can be removably attached to an outer casing member 50 through attachment pins, attachment bolts, attachment platform, or the like located on a lamp body's inner or outer surface, and/or top and bottom surface. A lamp body 160 can be hollow on the inside allowing it to slide over an outer casing member 50, inner casing member 20, and moving member 60. A lamp body 160 can be made of such as, for example, brass, steel, aluminum, ceramic, wood, plastics, plaster, pottery, or the like. A lamp body 160 can have an outer surface that can be a variety of shapes such as, for example, circular, spherical, hexagonal, triangular, rectangular, or any combination of shapes, or the like. A lamp body 160 can have an inner surface that can be larger in size than an outer body attachment device. In certain embodiments a lamp body 160 can comprise a plurality of connection pins. A lamp body 160 can be slid over an outer casing member 50 and removably attached to an outer body by sliding an outer body and locking it into place with a plurality of connection pins. A connection pin can be attached to a lamp body 160 by such as, for example, welding, bolting, gluing, or the like. A connection pin can be a dowel pins, spring pins, plug gauges, spring plungers, spring dowel pins, quick release pins, locking pins, or the like.

In embodiments a lampshade 180 can be removably connected to a light source 150, lamp socket, and/or an inner casing member top section 22. A lampshade 180 can be such as, for example, circular, square, rectangular, hexagonal, or the like in shape. In addition, a lampshade 180 can have a height of at least 3 inches, at least 4 inches, at least 5 inches, at least 6 inches, at least 7 inches, at least 8 inches, at least 9 inches, at least 10 inches, at least 11 inches, at least 12 inches, at least 13 inches, at least 14 inches, or the like. A lampshade 180 can have a height of at most 3 inches, at most 4 inches, at most 5 inches, at most 6 inches, at most 7 inches, at most 8 inches, at most 9 inches, at most 10 inches, at most 11 inches, at most 12 inches, at most 13 inches, at most 14 inches, or the like. A lampshade 180 can have a bigger diameter on its bottom then on its top. A lampshade 180 can be such as, for example clothe, denim, ceramic, leather, or the like.

In embodiments a light source 150 can be an LED, a light bulb, incandescent, halogen, fluorescent, or the like and can removably or permanently connected to an inner casing member's 20 top section 22 by such as, for example, a LED jack, a socket, an adapter, or the like. A light source's 150 wires can be routed through the inner casing member's 20 top section's 24 thru hole. In certain embodiments a light source 150 can be powered by direct current, or alternating current.

Figure 10:
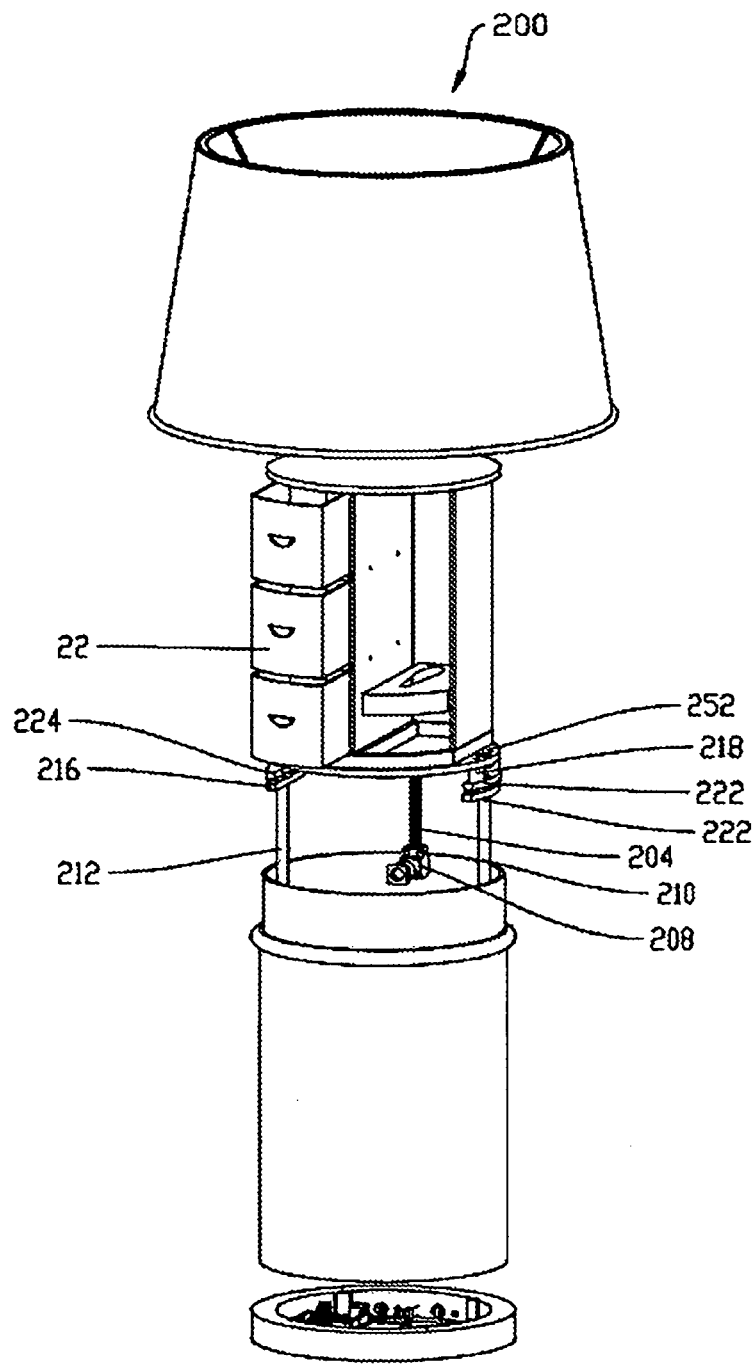
FIG. 10 shows isometric exploded view of an additional embodiment of a lamp safe system, in accordance to one, or more embodiments.
Figure 11:
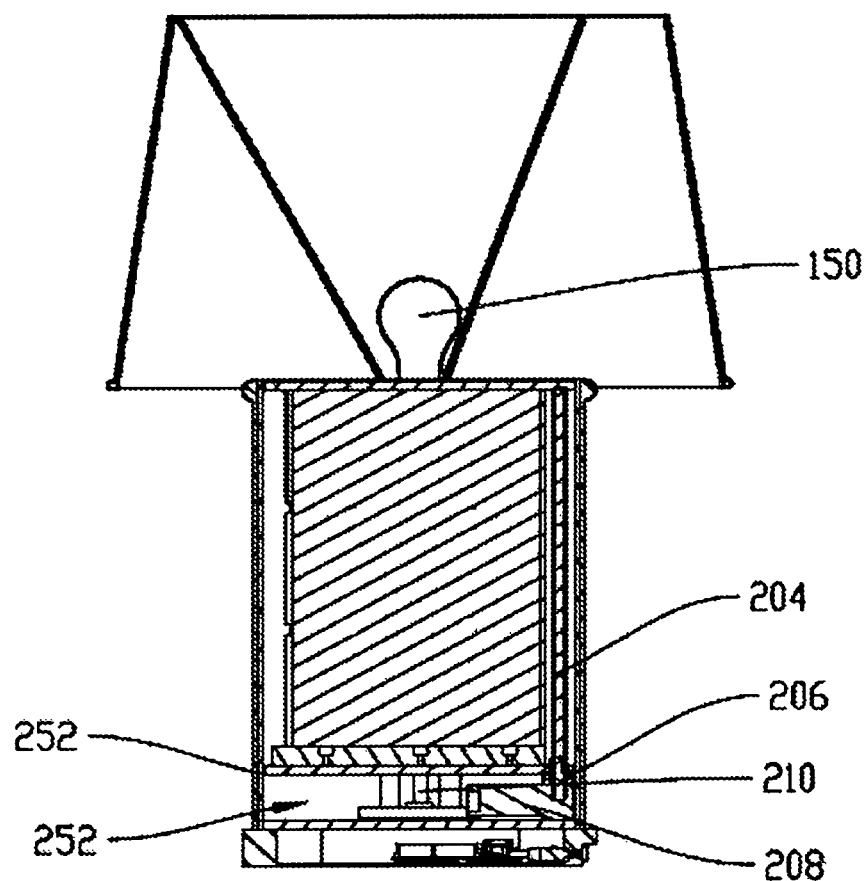
FIG. 11 shows a cross-section view of an additional embodiment of a lamp safe system, in accordance to one, or more embodiments.

Referring to FIGS. 10 and 11 an isometric view of an alternative embodiment a lamp safe system, and a cross section of a lamp safe system in its closed state is shown generally at 200. A moving member 202 can comprise a lead screw 204; a lead screw nut 206; a motor 208; a first linear guide rod 210 and a second linear guide rod 212; a first linear guide block 214 and a second linear guide block 216; a first sleeve bearing 218 and a second sleeve bearing 220 (not shown); and a first linear guide rod supports 222 and a second linear guide rod supports 224. An inner casing member's 250 bottom section 252 can be removably or permanently attached to a moving member 202 by a lead screw nut 206, a first sleeve bearing 218, a first linear guide 210 and a second linear guide 212, a first linear guide support 222 and a second linear guide support 224, and a first linear guide block 214 and a second linear guide block 216. A lead screw nut 206 can be connected to a bottom section 252 by a weld, bolts and nuts, snap rings, and/or it can be casted into a bottom section as one piece. An inner casing member 250 can be move in and out of an outer casing member 50 with a motor 208 twisting a lead screw 204 and driving a lead screw nut 206 that can be attached to an inner casing member's 250 bottom section 252.

Figure 12:
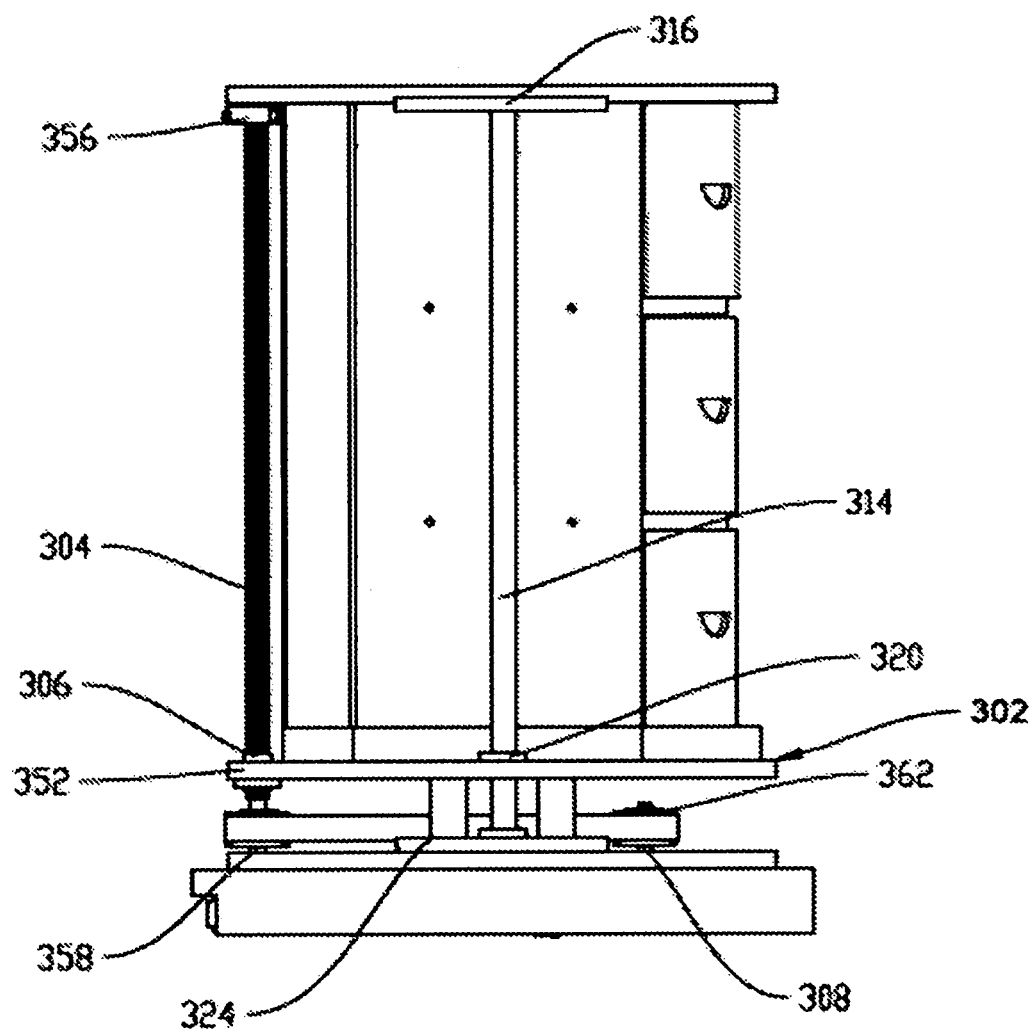
FIG. 12, shows a side of with a lamp body, a lampshade, a light source, and an outer casing being omitted in its closed state, in accordance to one, or more embodiments.
Figure 13:
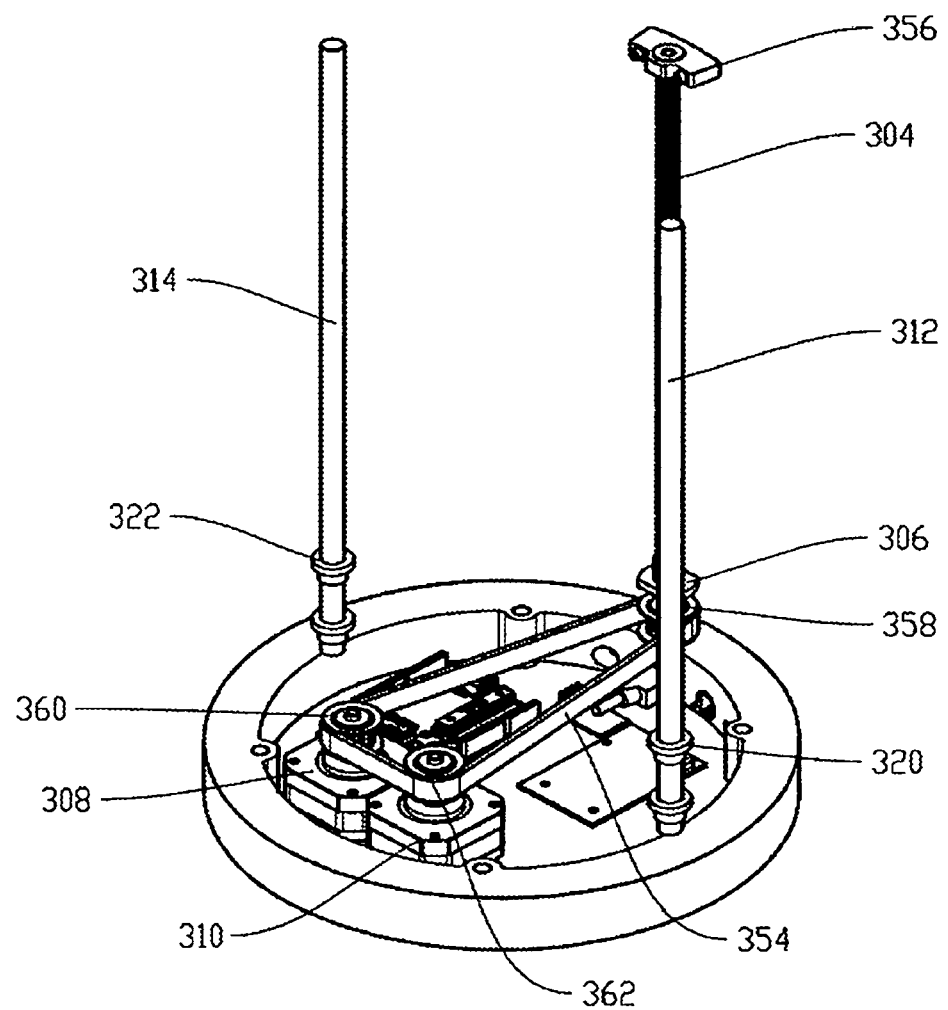
FIG. 13, shows a isometric view of an additional embodiment of a lamp safe system with a outer casing, a lamp body, a inner casing, a lamp body, and a lampshade omitted, in accordance to one, or more embodiments.

Referring to FIGS. 12 and 13 a side view and an isometric view of an alternate embodiment. A moving member 302 can comprise a lead screw 304; a lead screw nut 306; a first motor 308 and a second motor 310; a first linear guide rod 312 and a second linear guide rod 314; a first linear guide block 316 and a second linear guide block 318 (not shown); a first sleeve bearing 320 and a second sleeve bearing 322; and a first linear guide rod supports 324 and a second linear guide rod supports 326 (not shown); a first motor pulley 360 and a second motor pulley 362; a lead screw pulley 358, lead screw support 356; and a belt 354. An inner casing member's 350 bottom section 352 can be removably or permanently attached to a moving member 302 by a lead screw nut 306, a first sleeve bearing 320, a first linear guide 312 and second linear guide 314, a first linear guide support 324 and second linear guide support 326, and a first linear guide block 316 and second linear guide block 318 (not shown). A lead screw nut 306 can be connected to a bottom section 352 by a weld, bolts and nuts, snap rings, and/or it can be casted into a bottom section as one piece. An inner casing member 350 can be move in and out of an outer casing member 50 with a first and a second motor 308, 310 twisting a lead screw 304 and driving a lead screw nut 306 that can be attached to an inner casing member's 350 bottom section 352.

Figure 14:
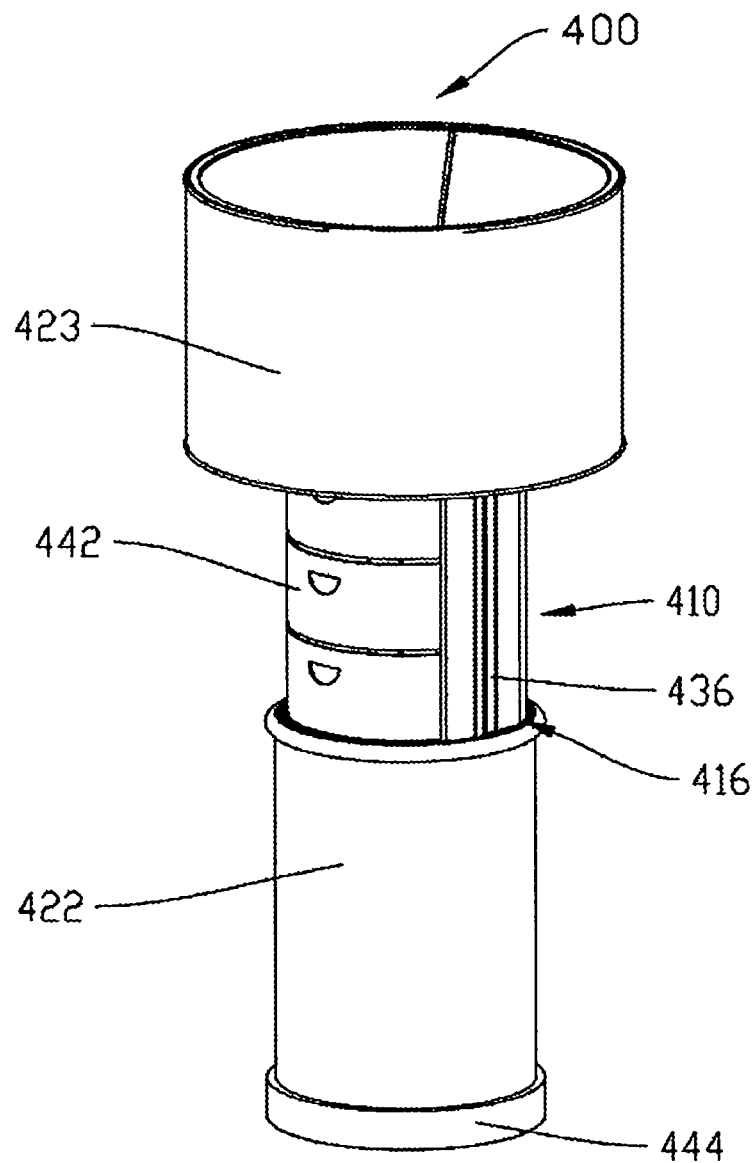
FIG. 14, shows a isometric view of an additional embodiment in accordance to one, or more embodiments.
Figure 15:
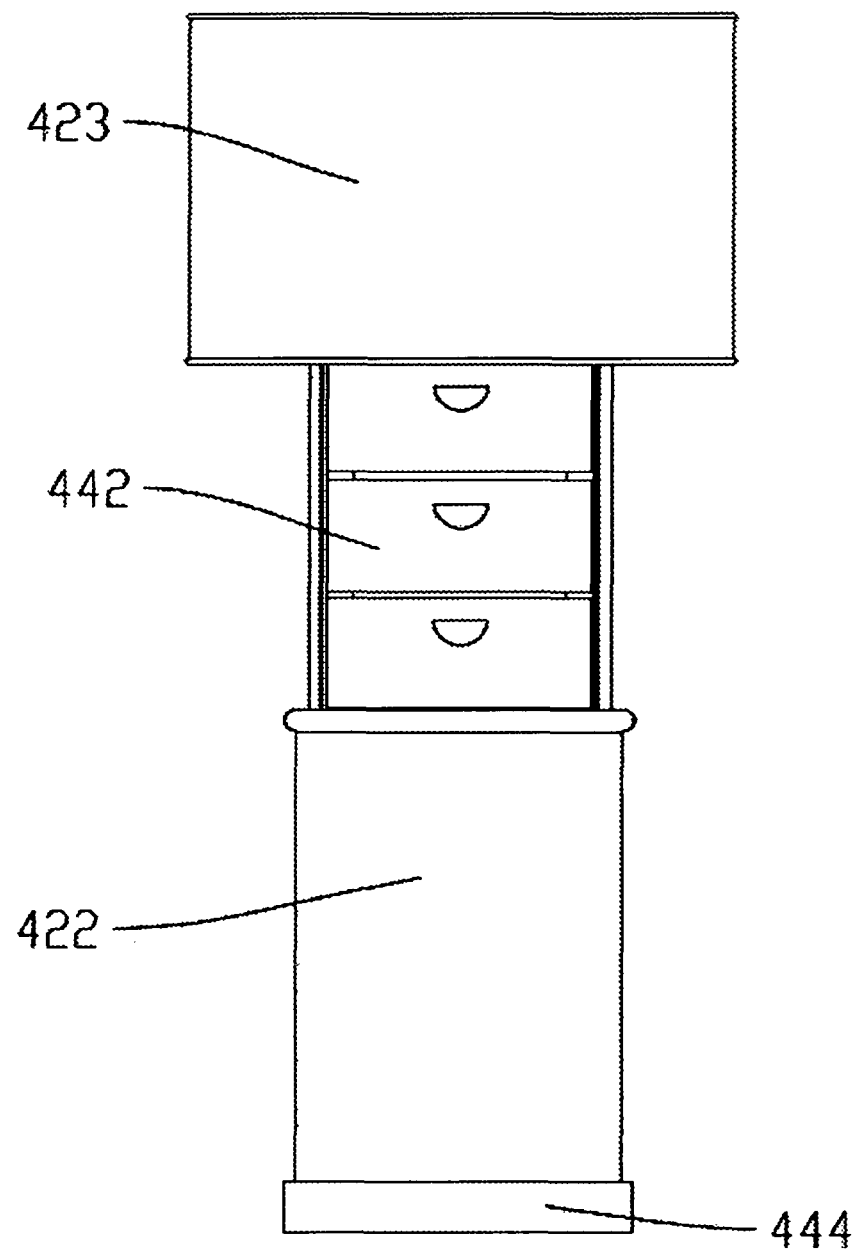
FIG. 15 shows a front view of an additional embodiment of a lamp safe system, in accordance to one, or more embodiments.
Figure 16:
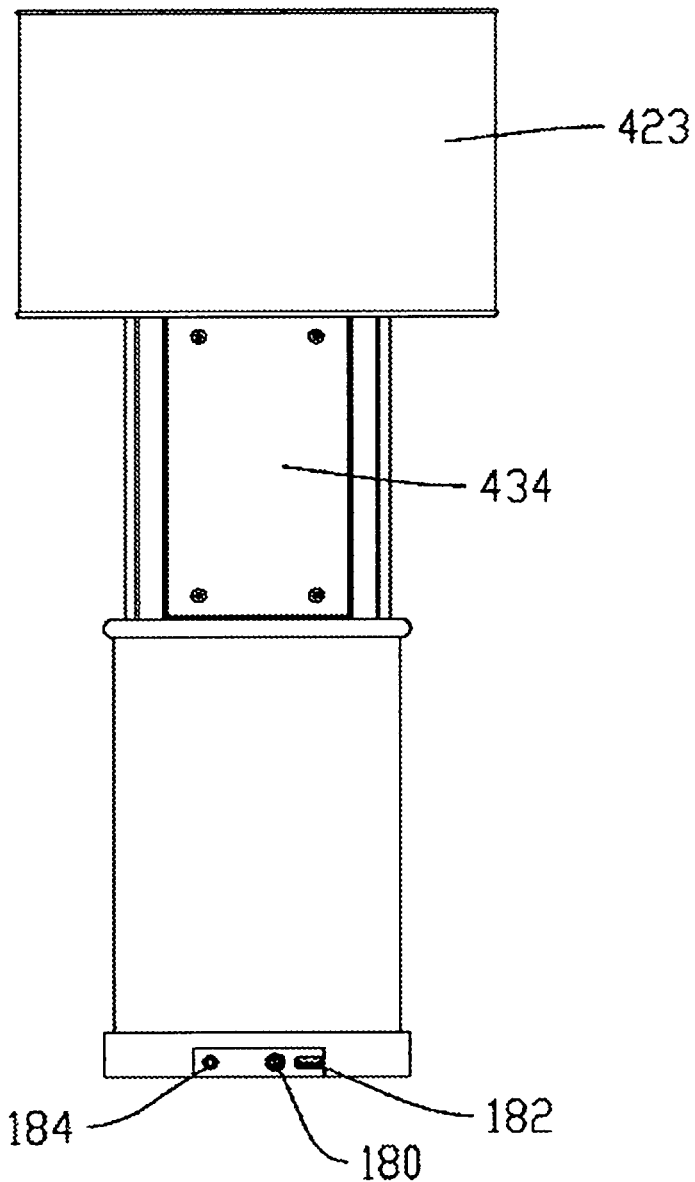
FIG. 16 shows a back view of another additional embodiment of a lamp safe system in its open state, in accordance to one, or more embodiments.

Referring to FIGS. 14, 15, and 16 an isometric view, a front view, and a back view of an alternative embodiment of a lamp safe system shown generally at 400. A lamp safe system 400 can comprise an inner casing member 410, an outer casing member 416, a top member 418, a lead screw 411, a lead screw nut 412, a motor 414, a base member 444, a lamp body 422, a lampshade 423, a light source 425, and an electrical system 424. An inner casing member 410 can be removable attached to a lead screw nut 412, which can connect to a lead screw 411. A lead screw 411 can attach to a motor 414 by a hole on the end of a lead screw and a setscrew can be tightened down onto a motor's shaft securing the lead screw to the motor. A motor 414 can attach to an outer casing by bolts, tacking, pins, glue, weld or the like. A motor 414 can attach to an outer casing in such as, for example, a bottom surface, a motor indentation, a top surface or the like. A motor 414 can attach to an outer casing by such as, for example, bolts, glue, clamp, or the like. A lamp safe system 400 can have one motor, two motors, three motors, four motors, or the like. As a motor 414 rotates its shaft, an attached lead screw 411 rotates in a lead screw nut 412, which can move in and out an inner casing member 410 out of an outer casing member 416.

In alternate embodiments an inner casing member 410 can have built in rails 436 on its outer walls, which can slide on an outer casing member 416 built in rails. An inner casing 416 can have a top surface, a bottom surface, a first wall, a second wall, and a back wall. A first wall and a second wall, and a back wall can extend perpendicularly from a top surface and a bottom surface. A first wall and a second wall, and a back wall can be permanently attached to a top surface, and a bottom surface. An inner casing member 410 can be made as such as, for example, one piece, two pieces, three pieces, four pieces, five pieces, six pieces, or the like. An inner casing member 410 can be injection molded, extrusion blowing molded, vacuum formed, compression molded, or the like. An inner casing member 410 can have a back platform that a lead screw nut 412 can attached to by such as, for example, bolts, glued, brazed, or the like. An inner casing member 410 top surface can have a thru hole to allow for a light source's 150 wiring to be routed to a microcontroller 172. An inner casing member 410 can have a back cover 434 removably or permanently attached to it by bolts, screws, glue, molded as one piece, or the like. In embodiments an inner casing can have a plurality of holes for pins, or a plurality of drawer shelves 440, which can be integrated into an inner casing's a first wall and a second wall. A plurality of holes for pins, or a plurality of drawer supports can hold one or more drawers 442. A drawer support 440 can be integrated into an inner casing member's walls, or an inner casing member's walls can have holes that can support pins pressed fit, or loose fit into it.

Figure 17:
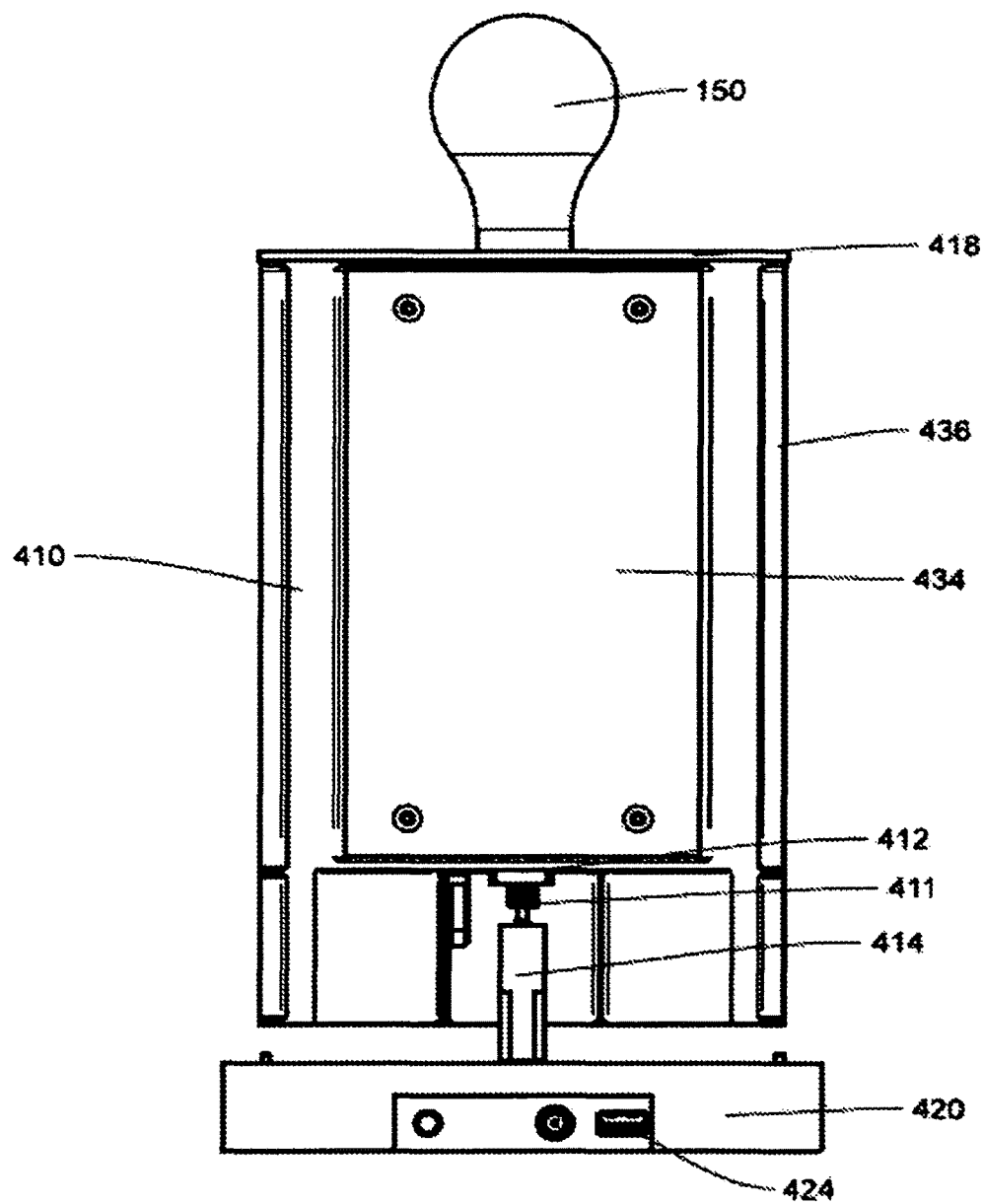
FIG. 17 shows a back view with a lamp body, a outer casing, and a lampshade being omitted in its closed state, in accordance to one, or more embodiments.
Figure 18:
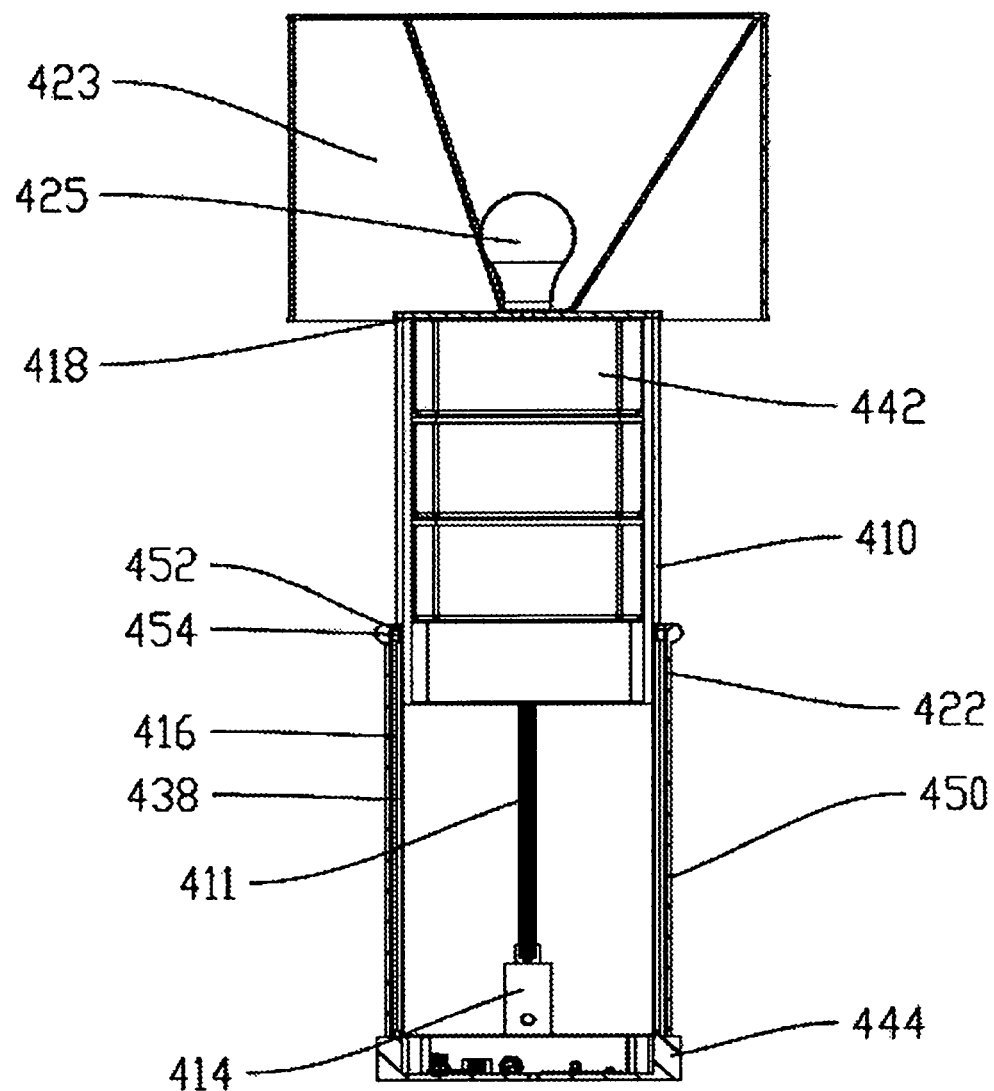
FIG. 18 shows a sectional view of another embodiment of a lamp safe system in its open state, in accordance to one, or more embodiments.

Referring to FIGS. 17, and 18 a cross sectional view of an alternate embodiment in its closed state, and a cross section view of an alternate embodiment in its open state. An outer casing member 416 can have a top section, a bottom section, and two or more walls in between the top section and the bottom section. An outer casing member 416 can have rails 438 integrated in its walls extending from its top section to its bottom section. In certain embodiments an outer casing member's 416 integrated rails can be semi-circular, half a square, half a rectangle, or the like. An outer casing member's 416 integrate rails can have one or more platforms 454 for a lamp body member 450 to attach itself to. An inner casing member 410 can move in and out on its rails and an outer casing member's 416 rails 438. In certain embodiments a outer casing member can be made of plastics, metals, delrin, high temperature metals, high temperature plastics, or the like.

In embodiments an alternative lamp safe system can have a lamp body member 450 can be have one or more attachment prongs 452, which can be removably attached to an outer casing member's 416 one or more platforms 454. An attachment prong 452 can be on an lamp body member's inner surface, and on its top or bottom. A lamp body 450 can slide over the outer casing member 416, and inner casing member 410 and attach to an outer casing member's platforms 454. In certain embodiments a platform can partially fill a outer casing members 416 rail grooves with a hole for a bolt, pin, screw, or the like. In certain embodiments a lamp body member 450 can attach itself to an outer casing member 416 by having a strap connected from one side of a lamp body member and going to the other side, and being bolted on a bottom surface of an outer casing member 416. In other embodiments a base member can 444 can have slots on its top surface, which a lamp body member 450 can slide into and lock, into place.

In alternate embodiments a lamp safe system can have a base member 444 that can be removably attached to an outer casing member 416 by bolts, pins, glue, or the like. An outer casing member's 416 bottom can be removably connected to a base member 444. A base member 444 can have an inner diameter and an outer diameter which can create a wall thickness and a top, and a bottom. A base member's 444 bottom can have a plurality of electrical attachment points for such as, for example, a microcontroller 172, a Wi-Fi module 174, a GPS module 176 (not shown), and an RFID module 178. A base member 444 can have a plurality of threaded holes on its top along its inside perimeter. A base member 444 can be such as, for example, a circle, a square, a rectangle, a hexagon, or the like in shape. A base member 444 can have a height of at least 0.125 inch, at least 0.25 inch, at least 0.75 inch, at least 0.825 inch, at least 1.0 inch, at least 1.125 inch, or the like. A base member 444 can have a height of at most 0.125 inch, at most 0.25 inch, at most 0.75 inch, at most 0.825 inch, at most 1.0 inch, at most 1.125 inch, or the like.

In embodiments a base member 444 can have a back portion that can have a cut out, which can have thru holes for an on/off switch 162, a female USB port 164, DC barrel jack 166, and a thru hole port for a Wi-Fi antenna, a GPS antenna, and a RFID coil antenna. A base member's 444 back portion can have a cover (not shown) on it to match a base member's shape, which can have ports for a on/off switch 162, a female USB port 182, DC barrel jack 184. An RFID antenna can be hidden behind a cover (not shown). A cover (not shown) can be plastic, rubber, acrylic, or the light to allow for a Wi-Fi antenna, a GPS antenna, and a RFID coil antenna signal to penetrate and a Wi-Fi module 150, a GPS module 152 (not shown), and an RFID module 154 can receive the signal. In certain embodiments a cover can be omitted, and a signal can go through a base member 444. In certain embodiments a base member 444 can have an access port in its bottom, and can have a cover that can lock into place and can only be accessed by a key, which can give a user access to a motor, and electronics. An access port can allow a user to raise and lower one or more motors, and/or control electronics.

In certain embodiments a base member 444 can have a hole for a magnet (not shown) to be removable attached to the base member 444. A magnet can be an electro-magnet, rare-earth magnet, permanent magnet, or the like. In certain embodiments magnet can have an on/off switch 162 located on an outer casing's member or base member 444. An electromagnet can be attached to a battery and to a power supply that can be plugged into a wall socket. A battery can power a magnet during a power outage, such that the magnet can stay active and attached to and connected through an armature a nightstand or desk during a power outage. A magnet can have an armature that can be on the opposite side of a desk or nightstand's wall that when a magnet is active, the armature and magnet hold the safe assembly tightly onto the desk or nightstand's top.

Figure 19:
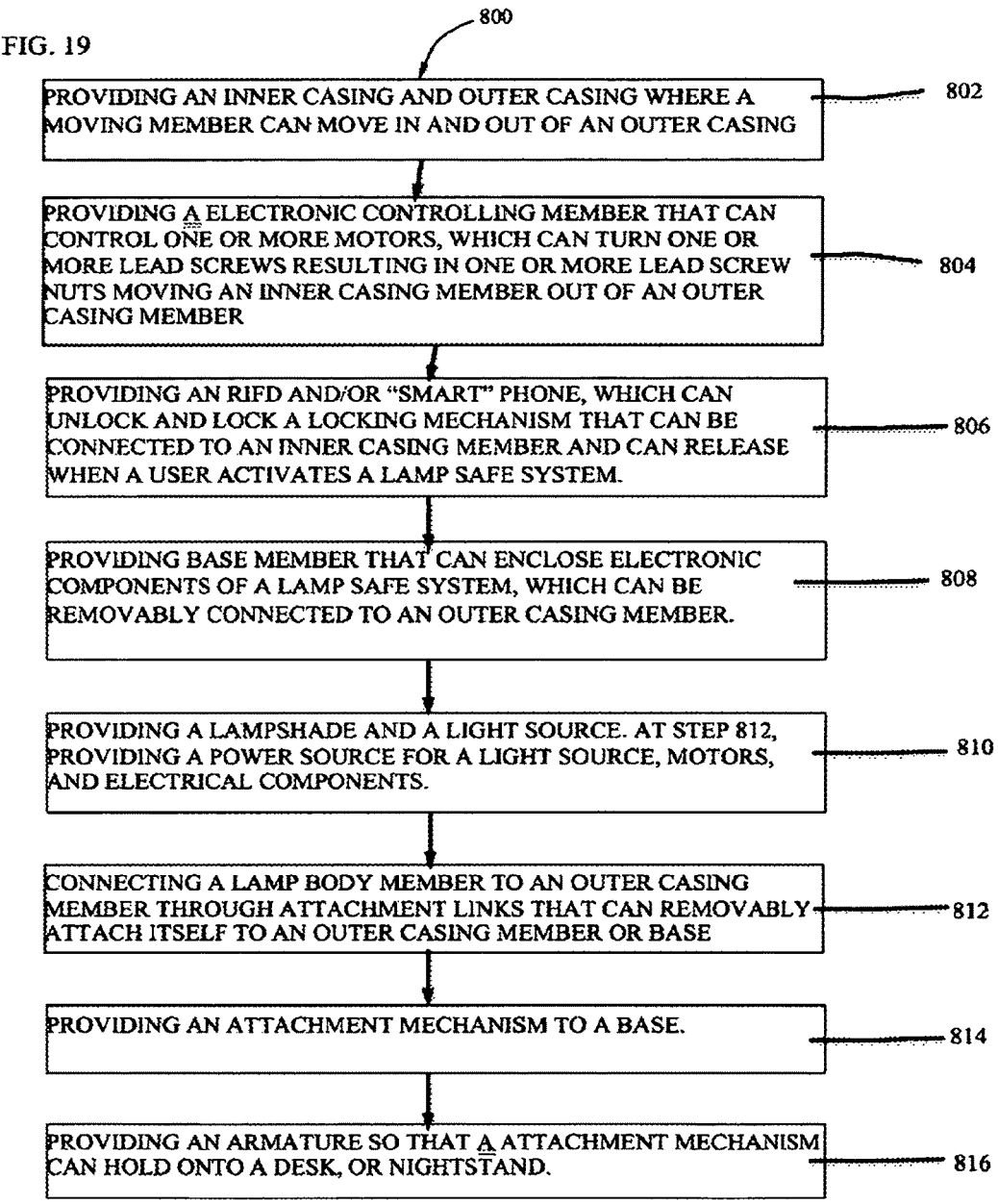
FIG. 19 is a block diagram of an exemplary method of operation of a lamp safe system, in accordance with one or more embodiments.

Referring to FIG. 19, a block diagram illustrating an exemplary method 800 associated with a method of use for lamp safe system. As a preliminary step to one variant of the exemplary embodiment can include providing lamp safe system components as described herein. At step 802, providing an inner casing and outer casing where a moving member can move an inner casing in and out of an outer casing. At step 804, providing a electronic controlling member that can control one or more motors, which can turn one or more lead screws resulting in one or more lead screw nuts moving an inner casing member out of an outer casing member. At step 806, providing an RIFD and/or "smart" phone, which can unlock and lock a locking mechanism that can be connected to an inner casing member and can release when a user activates a lamp safe system. At step 808, providing base member that can enclose electronic components of a lamp safe system, which can be removably connected to an outer casing member. At step 810, providing a lampshade and a light source. At step 812, providing a power source for a light source, motors, and electrical components. At step 814, connecting a lamp body member to an outer casing member through prongs that can removably attach itself to an outer casing member or base member. At step 814, providing an attachment mechanism such as magnet to a base. At step 816, providing an armature so that a magnet can hold onto it through a desk, or nightstand. At step 818, providing GPS, Wi-Fi, iBeacon, wireless data exchange to communicate to a computer, "smart" phone and/or tablet.

Referring to FIG. 20, a block diagram illustrating an exemplary method 900 associated with controlling a lamp safe system through a computer device, and a microcontroller. As a preliminary step to one variant of the exemplary embodiment can include providing lamp safe system components as described herein. At step 902, opening and closing a lamp safe system through a RFID card, and/or program on a computer device that can send a signal through Wi-Fi or Blue-tooth to a microcontroller, which can activate a motor, a lock, and can raise an inner casing member out of an outer casing member. At step 904, detecting a user's distance from a lamp safe system through a microcontroller, and computer device which can detect a user's distance and automatically close a lamp safe system if a user gets five or more feet away from a lamp safe system. At step 906, detecting vibration in a lamp safe system through a microcontroller which sends data to a user's computer device alerting a user of motion, or vibration. At step 908, detecting and sending data to a user's computer device, which can alert a user when a lamp safe system is opening and closing when not in proximity to a lamp safe system. At step 910, sending and receiving data through a microcontroller and GPS unit to a user's computer device, which can automatically locate a lamp safe system. At step 912, detecting an obstruction when an inner casing member is moving into an outer casing member through a microcontroller. At step 914, turning on and off a light remotely through a lamp safe system and its microcontroller.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of the present disclosure, which is defined solely by the claims. Accordingly, embodiments of the present disclosure are not limited to those precisely as shown and described.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the disclosure are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar referents used in the context of describing the disclosed embodiments (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present disclosure and does not pose a limitation on the scope of the embodiments otherwise claimed. No language in the present specification should be construed as indicating any non-claimed element essential to the practice of the disclosed embodiments.

EXAMPLES

The following non-limiting examples are provided for illustrative purposes only in order to facilitate a more complete understanding of representative embodiments. These examples should not be construed to limit any of the embodiments described in the present specification including those pertaining to the method of correcting pectus carinatum.

Example 1

Safely Locking Away Personal Items

In a lamp safe system, a user can put items such as, rings, necklaces, coins, etc. in the drawers, and on hooks within the inner casing of a lamp safe system. A user can push an image on a smart phone and the inner casing can go into an outer casing where a female flange and a male flange touch, and a locking mechanism engages locking an inner casing down into an outer casing. Once the lamp safe system is locked, the accelerometer is turned on allowing the user to receive information on his/her computer or phone whether the lamp safe system is moved, or shaken. A lamp safe system can be removably attached through a magnet and armature to a night stand or desk keeping the lamp safe system securely attached to a desk, nightstand, or the like.

A user can place his/her hand on a biometrics reader or lock that can disengage a lock releasing the inner casing and ejecting it out of an outer casing body. In addition, a biometrics reader, switch, or lock can disengage the accelerometer when the inner casing ejects out of an outer casing. If a thief comes into a room where the lamp safe system is located, the thief can only see a lamp and not a safe keeping the valuable items safe inside.

Example 2

Quick Access to Gun in Emergency

In a lamp safe system, a user can put a gun inside an inner casing. The inner casing can be moved up and down an outer casing keeping the gun safe inside. If a user needs a gun in an emergency, the inner casing can quickly be ejected out of the outer casing by "smart" technology or a RFID lock on lamp safe system. If somebody tries shaking the safe or tries opening the safe, an accelerometer or vibration sensor in connection with an electrical system, a smart phone can send a message through an application on a user's phone that the lamp safe system is being shaking or opened without the user's permission.

What is claimed is:

1. A lamp safe system, said system comprising:
    an inner casing comprising a top section, a base section, two or more side sections, and a back section wherein said top section, said base section, said two or more side section, and said back section are attached to each other to form said inner casing wherein said base section has a plurality of attachment holes, and said side sections have a plurality of holes;
    an outer casing comprising an outer wall and an inner wall, and a base member wherein said base member is attached to said outer wall and said inner wall;
    a bottom component is removably attached to said base member wherein said bottom component has a plurality of attachment points wherein said attachment points attach a lifting system wherein said lifting system comprises at least one motor, at least one lead screw, at least one lead screw nut, at least one linear guide pin, at least one bearing pulley support, at least one belt, at least two timing pulley, at least one linear guide rod support and at least one belt pulley bearing support wherein said lead screw is placed on said belt pulley bearing support, and connected to said timing pulley wherein said lead screw nut is translated by said lead screw; said linear guide pin is connected to said bottom component, and said linear guide rod support, and a sleeve bearing translates freely on said linear guide rod wherein said sleeve bearing, and said lead screw nut are attached to said inner casing's said base section, wherein said belt links said motor and said timing pulley, and said lead screw, said timing pulley together allowing for said motor to rotate said lead screw and to translate said lead screw nut;
    a locking system, comprising of a lock and a locking block, wherein said lock is attached to said bottom component, and said locking block is attached to said base member;
    a light wherein said light is attached to a top component, wherein said top component can be removably attached to said inner casing's top;
    a gun holder wherein said gun holder can removably attach to said inner casing;
    a plurality of drawers;
    a lampshade wherein said lampshade is connected to said light; and
    a lamp body.

2. A lamp safe system as set forth in claim 1, wherein said inner casing is formed from more than one piece.

3. A lamp safe system as set forth in claim 1, wherein said outer casing further comprises attachment links for said lamp body.

4. A lamp safe system as set forth in claim 1, wherein said outer casing has one or more guide rails attached to its inner wall.

5. A lamp safe system as set forth in claim 1, wherein said inner casing has said sleeve bearings attached to its base section.

6. A lamp safe system as set forth in claim 1, wherein said lamp safe system can further comprise an accelerometer, a global position system ("GPS"), a microprocessor, a transmitting device, a microphone, a biometrics reader, a locking mechanism, a Wi-Fi device, a USB port, and a wireless data exchange system.

7. A lamp safe system as set forth in claim 6, wherein said wireless data exchange system connects to said lamp safe system to a computing device through Wi-Fi, Bluetooth, and/or Bluetooth Low Energy.

8. A method of use for a lamp safe system, which comprises:
    providing an inner casing and an outer casing where a moving member can move in and out of said outer casing;
    providing an electronical controlling member that can control one or more motors, which can turn one or more lead screws resulting in one or more lead screw nuts to move an inner casing member out of said outer casing member;
    providing an RFID and/or a smart phone, which can unlock and lock a locking mechanism that can be connected to said inner casing and can release when a user activates a unlocking mechanism on a wireless data exchange system;
    providing a base component that attaches a plurality of electronical components, which can be removably connected to said outer casing and base member;
    providing a lampshade and a light source, providing a power source for said light source, said motors, and said electrical components;
    connecting a lamp body member to an outer casing member through attachment links that can removably attach itself to said outer casing or said base member;
    providing an attachment mechanism to a base wherein said attachment mechanism can hold onto a desk, or a nightstand.

9. A method of use for a lamp safe system, which comprises:
    opening and closing a lamp safe system through a RFID card, and/or program on a computer device that can send a signal through Wi-Fi and/or Bluetooth to a microcontroller, which can activate a motor, a lock, and raises an inner casing out of an outer casing;

detecting a user's distance from a lamp safe system through a microcontroller, and said computer device which can detect a user's distance and automatically close a lamp safe system if a user gets at least five or more feet away from a lamp safe system;

detecting vibration through said microcontroller which sends data to a user's computer device alerting a user of motion, or vibration;

detecting and sending data to said computer device, which can alert a user when a lamp safe system is opening and closing when not in proximity to a lamp safe system;

sending and receiving data through a microcontroller and GPS unit to a said computer device, which can automatically locate a lamp safe system;

detecting an obstruction when said inner casing is moving into said outer casing through a microcontroller;

turning on and off a light remotely through said computer device, and said microcontroller.

10. A method of claim 9, wherein said computer device activates a locking mechanism.

11. A method of claim 8, wherein said inner casing is configured to eject out of said outer casing by one or more lead screws.

12. A method of claim 8, wherein said lamp body is placed over and connected to said outer casing.

13. A method of claim 8, wherein said lamp body can be removed and replaced with a different type of lamp body.

* * * * *